US009758688B2

(12) United States Patent
Iijima et al.

(10) Patent No.: US 9,758,688 B2
(45) Date of Patent: Sep. 12, 2017

(54) COMPOSITION FOR FORMING CONDUCTIVE FILM

(71) Applicant: Sumitomo Chemical Company, Limited, Tokyo (JP)

(72) Inventors: Takayuki Iijima, Tsukuba (JP); Ken Sakakibara, Tsukuba (JP); Hideyuki Higashimura, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 213 days.

(21) Appl. No.: 14/428,383

(22) PCT Filed: Sep. 20, 2013

(86) PCT No.: PCT/JP2013/076451
§ 371 (c)(1),
(2) Date: Mar. 16, 2015

(87) PCT Pub. No.: WO2014/046306
PCT Pub. Date: Mar. 27, 2014

(65) Prior Publication Data
US 2015/0275015 A1   Oct. 1, 2015

(30) Foreign Application Priority Data
Sep. 21, 2012   (JP) ................. 2012-207886

(51) Int. Cl.
C09D 11/52 (2014.01)
C23C 18/40 (2006.01)
C23C 18/44 (2006.01)
C08K 5/053 (2006.01)
C08K 5/098 (2006.01)
C08K 5/17 (2006.01)
H01B 1/22 (2006.01)
H01B 13/00 (2006.01)

(52) U.S. Cl.
CPC ............. C09D 11/52 (2013.01); C08K 5/053 (2013.01); C08K 5/098 (2013.01); C08K 5/17 (2013.01); H01B 1/22 (2013.01); H01B 13/0026 (2013.01)

(58) Field of Classification Search
CPC ......... C23C 18/40; C23C 18/44; C09D 11/52; C08K 5/053; C08K 5/098; C08K 5/17; H01B 13/09926; H01B 1/22
USPC ............. 106/1.23, 31.92; 252/519.3, 519.33, 252/520.3; 428/58
See application file for complete search history.

(56) References Cited
U.S. PATENT DOCUMENTS

| | | | | |
|---|---|---|---|---|
| 6,123,876 A * | 9/2000 | Kobayashi | ............. | H01J 1/316 252/512 |
| 6,197,366 B1 * | 3/2001 | Takamatsu | ............. | C23C 18/08 106/1.23 |
| 6,951,666 B2 * | 10/2005 | Kodas | ............. | C09D 11/30 257/E21.174 |
| 7,491,646 B2 * | 2/2009 | Wu | ............. | C23C 18/08 257/E21.159 |
| 2004/0211979 A1 * | 10/2004 | Shioiri | ............. | H05K 1/0233 257/199 |
| 2006/0130700 A1 | 6/2006 | Reinartz | | |
| 2007/0270591 A1 * | 11/2007 | Ashmead | ............. | C07F 15/025 548/101 |
| 2008/0020572 A1 | 1/2008 | Wu et al. | | |
| 2008/0206488 A1 | 8/2008 | Chung et al. | | |
| 2009/0136719 A1 | 5/2009 | Kawamura et al. | | |
| 2009/0214764 A1 | 8/2009 | Li et al. | | |
| 2009/0258202 A1 * | 10/2009 | Sakaguchi | ............. | C09D 11/52 106/31.92 |
| 2010/0233361 A1 | 9/2010 | Hu et al. | | |
| 2010/0252782 A1 | 10/2010 | Masahiro | | |
| 2011/0059233 A1 | 3/2011 | Liu et al. | | |
| 2011/0135808 A1 | 6/2011 | Liu et al. | | |
| 2011/0186956 A1 | 8/2011 | Hiroshige et al. | | |
| 2012/0032121 A1 | 2/2012 | Higashimura et al. | | |
| 2012/0168693 A1 | 7/2012 | Iijima et al. | | |
| 2013/0118786 A1 | 5/2013 | Chung et al. | | |
| 2013/0341571 A1 * | 12/2013 | Iijima | ............. | C08K 5/098 252/514 |
| 2014/0001422 A1 * | 1/2014 | Iijima | ............. | C08K 5/098 252/519.2 |

FOREIGN PATENT DOCUMENTS

| | | | |
|---|---|---|---|
| JP | H083605 A | 1/1996 | |
| JP | H1180647 A | 3/1999 | |
| JP | 200526081 A | 1/2005 | |
| JP | 2008028390 A | 2/2008 | |
| JP | 2008524395 A | 7/2008 | |
| JP | 2008531810 A | 8/2008 | |

(Continued)

OTHER PUBLICATIONS

English translation of the Written Opinion of the International Search Authority mailed Nov. 5, 2013 for PCT/JP2013/076451; 7 pages.*
Walker, et al., "Reactive Silver Inks for Patterning High-Conductivity Features at Mild Temperatures," Journal of the American Chemical Society, 134, pp. 1419-1421 (2012).
International Search Report issued Nov. 5, 2013 in International Application No. PCT/JP2013/076451.

(Continued)

*Primary Examiner* — Helene Klemanski
(74) *Attorney, Agent, or Firm* — Panitch Schwarze Belisario & Nadel LLP

(57) ABSTRACT

A composition is provided for forming a conductive film. The composition includes a metal compound, a reducing agent, an ionic compound and/or a polar compound, and a compound having at least one atom selected from a nitrogen atom, a sulfur atom and a phosphorus atom. The composition may be an ink composition for coating on an electronic device.

16 Claims, No Drawings

(56) References Cited

FOREIGN PATENT DOCUMENTS

| | | |
|---|---|---|
| JP | 2009221606 A | 10/2009 |
| JP | 2010209421 A | 9/2010 |
| JP | 2010219042 A | 9/2010 |
| JP | 201134750 A | 2/2011 |
| JP | 201158092 A | 3/2011 |
| JP | 2011119259 A | 6/2011 |
| JP | 2012137579 A | 7/2012 |
| WO | 03032084 A2 | 4/2003 |
| WO | 2011034177 A1 | 3/2011 |
| WO | 2011057218 A2 | 5/2011 |
| WO | 2012015263 A2 | 2/2012 |
| WO | WO 2012/124770 A1 * | 9/2012 |
| WO | WO 2012/124771 A1 * | 9/2012 |
| WO | 2012151500 A1 | 11/2012 |

OTHER PUBLICATIONS

Office Action dated Mar. 28, 2017 in JP Application No. 2014-536963.

Office Action dated Jun. 2, 2017 in JP Application No. 2014-536963.

* cited by examiner

US 9,758,688 B2

COMPOSITION FOR FORMING CONDUCTIVE FILM

CROSS-REFERENCE TO RELATED APPLICATION

This application is a Section 371 of International Application No. PCT/JP2013/076451, filed Sep. 20, 2013, which was published in the Japanese language on Mar. 27, 2014, under International Publication No. WO 2014/046306 A1, and the disclosure of which is incorporated herein by reference.

TECHNICAL FIELD

The present invention relates to a composition for forming a conductive film, a method of producing a conductive film using the composition, and a conductive film produced by the production method.

BACKGROUND ART

A method of forming a conductive film by a coating method using a composition containing a metal compound is expected as a method of forming a conductive film used in electronics applications (for example, wiring formation application and electrode formation application of electronic instruments). For example, methods of forming a conductive film used in electronics applications, using an ink composition containing a silver compound, are known (see, e.g., JP-A No. 2008-524395 and JP-A No. 2008-28390).

SUMMARY OF THE INVENTION

However, the above-described conductive film formed from an ink composition has not necessarily sufficient electric conductivity.

The present invention has an object of providing a composition for forming a conductive film, useful for formation of a conductive film excellent in electric conductivity. Further, the present invention has an object of providing a method of producing a conductive film using this composition and a conductive film produced by this production method.

The present invention provides a composition for forming a conductive film, a method of producing a conductive film using the composition, and a conductive film produced by the production method, described below.

[1] A composition for forming a conductive film, comprising a metal compound, a reducing agent, and an ionic compound and/or a polar compound.

[2] The composition for forming a conductive film according to [1], wherein the metal constituting the above-described metal compound is gold, silver or copper.

[3] The composition for forming a conductive film according to [1] or [2], wherein the above-described metal compound is a metal carboxylate.

[4] The composition for forming a conductive film according to any one of [1] to [3], wherein the above-described reducing agent is an alcohol.

[5] The composition for forming a conductive film according to any one of [1] to [4], wherein the molecular weight of the above-described ionic compound and/or polar compound is 1000 or more.

[6] The composition for forming a conductive film according to any one of [1] to [5], wherein the above-described ionic compound and/or polar compound is 0.1 to 30 parts by weight with respect to 100 parts by weight of the above-described metal compound.

[7] The composition for forming a conductive film according to any one of [1] to [6], wherein the above-described ionic compound and/or polar compound is an ionic compound.

[8] The composition for forming a conductive film according to any one of [1] to [7], further comprising a compound having at least one atom selected from the group consisting of a nitrogen atom, a sulfur atom and a phosphorus atom.

[9] The composition for forming a conductive film according to [8], wherein the above-described compound having a nitrogen atom is an amine compound.

[10] The composition for forming a conductive film according to [8], wherein the above-described compound having a sulfur atom is a sulfide compound.

[11] The composition for forming a conductive film according to any one of [1] to [10], wherein the composition is an ink composition.

[12] A method of producing a conductive film, comprising a step of coating the ink composition according to [11] and a step of reducing the above-described metal compound by heating the resultant coated film.

[13] The method of producing a conductive film according to [12], wherein the temperature of heating the above-described coated film is 200° C. or lower.

[14] A conductive film formed by the method of producing a conductive film according to Claim [12] or [13], and comprising an ionic compound and/or a polar compound.

[15] An electronic device, equipped with the conductive film according to [14].

[16] The electronic device according to [15], wherein the above-described conductive film is a cathode and/or an anode.

MODES FOR CARRYING OUT THE INVENTION

The composition for forming a conductive film of the present invention comprises a metal compound, a reducing agent, and an ionic compound and/or a polar compound.

In the present specification, the conductive film denotes a film having low surface resistance (namely, high electric conductivity).

The surface resistance of the conductive film is, when measured by a four probe method, usually smaller than $1000\Omega/\square$, preferably smaller than $500\Omega/\square$, more preferably smaller than $300\Omega/\square$, further preferably smaller than $100\Omega/\square$, particularly preferably smaller than $30\Omega/\square$. The conductive film can be used in electrodes, wiring, electromagnetic wave shielding materials, antistatic materials and the like.

The conductive film may be adjusted to suitable thickness depending on its use. The thickness of the conductive film is, from the standpoint of electric conductivity, preferably 1 nm or more, more preferably 30 nm or more, further preferably 100 nm or more. From the standpoint of shortening of the heating time in forming the conductive film, the thickness of the conductive film is preferably 1 mm or less, more preferably 1 μm or less, further preferably 500 nm or less.

In the composition for forming a conductive film of the present invention, the metal compound denotes a compound containing a metal element as a constituent element.

The metal compound is usually represented by the following formula (hh-1).

$$M^{m-}{}_{a}X^{m-}{}_{b} \qquad \text{(hh-1)}$$

(wherein, $M^{m+}$ represents a metal ion having positive charge. $X^{m-}$ represents an anion.

a and b represent each independently an integer of 1 or more. When there are a plurality of $M^{m+}$, they may be the same or different, and when there are a plurality of $X^{m-}$, they may be the same or different).

In the above-described formula (hh-1), a is usually an integer of 1 to 3, preferably 1 or 2. b is usually an integer of 1 to 3, preferably 1 or 2. Here, a and b are so combined that the compound represented by the above-described formula (hh-1) has no charge deviation as a whole, that is, the whole charge is balanced to zero.

In the above-described formula (hh-1), m represents an integer of 1 or more. The metal ion having positive charge represented by $M^{m+}$ includes, for example, a silver ion ($Ag^+$), a gold ion ($Au^+$, $Au^{3+}$), a platinum ion ($Pt^{4+}$), a palladium ion ($Pd^{4+}$, $Pd^{2+}$), a rhodium ion ($Rh^{3+}$), an iridium ion ($Ir^{4+}$, $Ir^{3+}$), a ruthenium ion ($Ru^{4+}$, $Ru^{2+}$), an osmium ion ($Os^{4+}$), an iron ion ($Fe^{3+}$, $Fe^{2+}$), a cobalt ion ($Co^{3+}$, $Co^{2+}$), a copper ion ($Cu^+$, $Cu^{2+}$, a lead ion ($Pb^{2+}$, $Pb^{4+}$, a tin ion ($Sn^{4+}$) and the like, preferably a silver ion, a gold ion, a platinum ion or a copper ion, more preferably a silver ion, a gold ion or a copper ion, further preferably a silver ion.

In the above-described formula (hh-1), n represents an integer of 1 or more. The anion represented by $X^{m-}$ includes, for example, $F^-$, $Cl^-$, $Br^-$, $I^-$, $OH^-$, $CN^-$, $NO_3^-$, $NO_2^-$, $ClO^-$, $ClO_2^-$, $ClO_3^-$, $ClO_4^-$, $HSO_4^-$, $SCN^-$, $BF_4^-$, $PF_6^-$, $R^3O^-$ (here, $R^3$ represents an optionally substituted hydrocarbyl group), $R^4COO^-$ (here, $R^4$ represents an optionally substituted hydrocarbyl group), $R^5SO_3^-$ (here, $R^5$ represents an optionally substituted monovalent hydrocarbyl group), $R^6OCO_2^-$ (here, $R^6$ represents an optionally substituted hydrocarbyl group), $CO_3^{2-}$, $S^{2-}$, $SO_4^{2-}$, $PO_4^{3-}$, $O^{2-}$ and the like, preferably $Cl^-$, $Br^-$, $I^-$, $NO_3^-$, $ClO^-$, $ClO_2^-$, $ClO_3^-$, $ClO_4^-$, $R^3O^-$, $R^4COO^-$, $R^5SO_3^-$, $R^6CO_3^-$, $CO_3^{2-}$, $PO_4^{3-}$ or $SO_4^{2-}$, more preferably $Cl^-$, $NO_3^-$, $ClO_4^-$, $R^4COO^-$, $R^5SO_3^-$, $R^6CO_3^-$, $CO_3^{2-}$, $PO_4^{3-}$ or $SO_4^{2-}$, particularly preferably $Cl^-$, $NO_3^-$, $ClO_4^-$, $R^4COO^-$, $CO_3^{2-}$ or $SO_4^{2-}$.

The hydrocarbyl groups represented by $R^3$, $R^4$, $R^5$ and $R^5$ (hereinafter, referred to as "$R^3$ to $R^6$" in some cases) include, for example, alkyl groups having a number of carbon atoms of 1 to 50 such as a methyl group, an ethyl group, a propyl group, an isopropyl group, a butyl group, an isobutyl group, a sec-butyl group, a tert-butyl group, a pentyl group, a hexyl group, a nonyl group, a dodecyl group, a pentadecyl group, an octadecyl group, a docosyl group and the like; cyclic saturated hydrocarbyl groups having a number of carbon atoms of 3 to 50 such as a cyclopropyl group, a cyclobutyl group, a cyclopentyl group, a cyclohexyl group, a cyclononyl group, a cyclododecyl group, a norbonyl group, an adamantyl group and the like; alkenyl groups having a number of carbon atoms of 2 to 50 such as an ethenyl group, a propenyl group, a 3-butenyl group, a 2-butenyl group, a 2-pentenyl group, a 2-hexenyl group, a 2-nonenyl group, a 2-dodecenyl group and the like; aryl groups having a number of carbon atoms of 6 to 50 such as a phenyl group, a 1-naphthyl group, a 2-naphthyl group, a 2-methylphenyl group, a 3-methylphenyl group, a 4-methylphenyl group, a 4-ethylphenyl group, a 4-propylphenyl group, a 4-isopropylphenyl group, a 4-butylphenyl group, a 4-tert-butylphenyl group, a 4-hexylphenyl group, a 4-cyclohexylphenyl group, a 4-adamantylphenyl group, a 4-phenylphenyl group and the like; arylalkyl groups having a number of carbon atoms of 7 to 50 such as a phenylmethyl group, a 1-phenyleneethyl group, a 2-phenylethyl group, a 1-phenyl-1-propyl group, a 1-phenyl-2-propyl group, a 2-phenyl-2-propyl group, a 3-phenyl-1-propyl group, a 4-phenyl-1-butyl group, a 5-phenyl-1-pentyl group, a 6-phenyl-1-hexyl group and the like. As the hydrocarbyl group, alkyl groups having a number of carbon atoms of 1 to 50 or aryl groups having a number of carbon atoms of 6 to 50 are preferable, alkyl groups having a number of carbon atoms of 1 to 12 or aryl groups having a number of carbon atoms of 6 to 18 are more preferable, alkyl groups having a number of carbon atoms of 6 to 12 or aryl groups having a number of carbon atoms of 6 to 12 are further preferable.

The hydrocarbyl group represented by $R^3$ to $R^6$ may have a substituent, and the substituent includes, for example, an alkoxy group, an aryloxy group, an amino group, a substituted amino group, a silyl group, a substituted silyl group, a halogen atom, an imine residue, an amide group, an acid imide group, a monovalent heterocyclic group, a mercapto group, a hydroxyl group, a carboxyl group, a cyano group, a nitro group and the like, preferably an amino group, a monovalent heterocyclic group, a mercapto group, a hydroxyl group or a carboxyl group, more preferably an amino group, a pyridyl group, a mercapto group, a hydroxyl group or a carboxyl group. When there are a plurality of substituents, these may be the same or different.

In the composition for forming a conductive film of the present invention, the metal compounds may be used each singly or two or more of them may be used in combination.

As the metal compound represented by the above-described formula (hh-1), a silver compound is preferable. The silver compound includes, for example, silver chloride, silver bromide, silver iodide, silver sulfide, silver oxide, silver nitrate, silver hypochlorite, silver chlorite, silver chlorate, silver perchlorate, silver acetate, silver sulfate, silver carbonate, silver phosphate, silver tetrafluoroborate, silver hexafluorophosphate, silver trifluoromethanesulfonate and the like. As the silver compound, silver nitrate, silver perchlorate, silver acetate, silver sulfate, silver carbonate, silver phosphate, silver tetrafluoroborate, silver hexafluorophosphate or silver trifluoromethanesulfonate is preferable, silver nitrate, silver perchlorate, silver acetate, silver carbonate, silver tetrafluoroborate, silver hexafluorophosphate or silver trifluoromethanesulfonate is more preferable, silver nitrate, silver acetate or silver carbonate is further preferable, silver acetate is particularly preferable, since these silver compounds show good solubility in a reducing solvent.

The reducing agent contained in the composition for forming a conductive film of the present invention includes, for example, hydrazine; sodium borohydride; carboxylic acids such as citric acid, oxalic acid and the like; formaldehyde; hydrogen gas; alcohol type reducing solvents such as 1,2-ethanediol (ethylene glycol), 1,2-propanediol, 1,3-propanediol, 1-butanol, 1,2-butanediol, 1,3-butanediol, 1,4-butanediol, 2,3-butanediol, pentanediol, hexanediol, heptanediol, octanediol, diethylene glycol, triethylene glycol, tetraethylene glycol, dipropylene glycol, hexylene glycol, 2-butene-1,4-diol, glycerol, 1,1,1-trishydroxymethylethane, 2-ethyl-2-hydroxymethyl-1,3-propanediol, 1,2,3-hexanetriol, benzyl alcohol, butylcarbitol, α-terpineol and the like; preferably alcohol type reducing solvents, more preferably 1,2-ethanediol (also referred to as "ethylene glycol"), 1,2-propanediol, 1,3-propanediol or 1-butanol.

In the composition for forming a conductive film of the present invention, the reducing agents may be used each singly or two or more of them may be used in combination.

In the composition for forming a conductive film of the present invention, the content of the reducing agent may be an amount not less than the amount for reducing at least a part of the metal compound. When the reducing agent is an agent other than alcohol type reducing solvents, the content of the reducing agent is usually 0.1 mol or more, preferably 1 mol or more, with respect to 1 mol of the metal compound. When the reducing agent is an alcohol type reducing solvent, the upper limit of its content is usually 100 L, preferably 60 L, more preferably 40 L, particularly preferably 30 L, with respect to 1 mol of the metal compound, and the lower limit of its content is usually 10 mL, with respect to 1 mol of the metal compound.

In the composition for forming a conductive film of the present invention, the ionic compound is an organic compound having an ionic group, and the polar compound is an organic compound having a polar group.

The boiling point of the ionic compound and the polar compound is preferably 200 degrees (200° C.) or higher. The reason for this is that when the boiling point is 200 degrees (200° C.) or higher, it does not easily evaporate in forming the conductive film.

The melting point of the ionic compound and the polar compound is preferably room temperature or lower (preferably, 25° C. or lower). The reason for this is that when the melting point is room temperature or lower, the electric conductivity of the conductive film tends to be more excellent.

The ionic group contained in the ionic compound includes, for example, a group represented by the formula: —SM", a group represented by the formula: —C(═O)SM", a group represented by the formula: —CS$_2$M", a group represented by the formula: —OM", a group represented by the formula: —CO$_2$M", a group represented by the formula: —NM" a group represented by the formula: —NRM", a group represented by the formula: —PO$_3$M", a group represented by the formula: —OP(═O)(OM")$_2$, a group represented by the formula: —P(═O)(OM")$_2$, a group represented by the formula: —C(═O)NM"$_2$, a group represented by the formula: —C(═O)NRM", a group represented by the formula: —C(═S)NRM", a group represented by the formula: —C(═S)NM"$_2$, a group represented by the formula: —B(OM")$_2$, a group represented by the formula: —BR$_3$M", a group represented by the formula: —B(OR)$_3$M", a group represented by the formula: —SO$_2$M", a group represented by the formula: —SO$_2$M", a group represented by the formula: —NRC(═O)OM", a group represented by the formula: —NRC(═O)SM", a group represented by the formula: —NRC(═S)OM", a group represented by the formula: —NRC(═S)SM", a group represented by the formula: —OC(═O)NM", a group represented by the formula: —OC(═O)NRM", a group represented by the formula: —OC(═S)NM"$_2$, a group represented by the formula: —OC(═S)NRM", a group represented by the formula: —SC(═O)NM"$_2$, a group represented by the formula: —SC(═O)NRM", a group represented by the formula: —SC(═S)NM"$_2$, a group represented by the formula: —SC(═S)NRM", a group represented by the formula: —NRC(═O)NM"

a group represented by the formula: —NRC(═O)NRM",
a group represented by the formula: —NRC(═S)NM"$_2$,
a group represented by the formula: —NRC(═S)NRM",
a group represented by the formula: —NR$_3$M', a group represented by the formula: —PR$_3$M', a group represented by the formula: —OR$_2$M', a group represented by the formula: —SR$_2$M', a group represented by the formula: —IRM', and, a group composed of an atomic group remaining after removing one hydrogen atom bonded directly to a carbon atom constituting an aromatic ring in an aromatic compound represented by the following formulae (n-1) to (n-13).

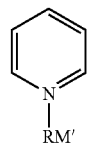

(n-1)

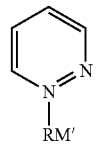

(n-2)

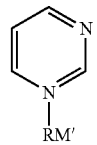

(n-3)

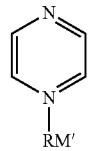

(n-4)

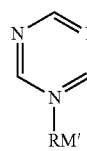

(n-5)

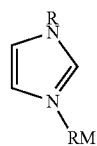

(n-6)

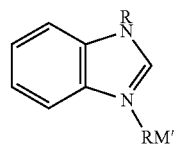

(n-7)

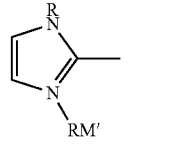

(n-8)

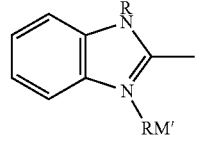

(n-9)

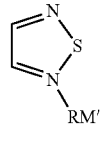

(n-10)

-continued (n-11)

[Structure: benzothiadiazole with RM' substituent]

(n-12)

[Structure: benzoxadiazole with RM' substituent]

(n-13)

[Structure: quinoline with RM' substituent]

In the formulae, R represents a hydrogen atom or an optionally substituted hydrocarbyl group, M" represents a metal cation or an optionally substituted ammonium cation, and M' represents an anion.

These groups may be accompanied by the other metal cation than M", and may be accompanied by the other anion than M', so that the whole charge of the ionic group is balanced to zero.

As the optionally substituted hydrocarbyl group represented by R, the same groups as the optionally substituted hydrocarbyl groups represented by $R^3$ to $R^6$ are exemplified.

As the metal cation represented by M", monovalent, divalent or trivalent ions are preferable. Examples of the metal cation represented by M" include a Li ion ($Li^+$), a Na ion ($Na^+$), a K ion ($K^+$), a Cs ion ($Cs^+$), a Be ion ($Be^{2+}$, a Mg ion ($Mg^{2+}$), a Ca ion ($Ca^{2+}$), a Ba ion ($Ba^{2+}$), a Ag ion ($Ag^+$), an Al ion ($Al^{3+}$), a Bi ion ($Bi^{3+}$), a Cu ion ($Cu^+,Cu^{2+}$), an Fe ion ($Fe^{3+},Fe^{2+}$), a Ga ion ($Ga^{3+},Ga^{2+}$), a Mn ion ($Mn^{4+}$, $Mn^{2+}$), a Pb ion ($Pb^{2+}$, $Pb^4$), a Sn ion ($Sn^{4+}$), a Ti ion ($Ti^{4+}$), a V ion ($V^{5+}$), a W ion ($W^{6+},W^{2+}$), a Y ion ($Y3^+$), a Yb ion ($Yb^{3+},Yb^{2+}$), a Zn ion ($Zn^{2+}$), a Zr ion ($Zr^{4+}$) and the like. As the metal cation represented by M", a Li ion ($Li^+$), a Na ion ($Na^+$), a K ion ($K^+$), a Cs ion ($Cs^+$), a Mg ion ($Mg^{2+}$), a Ca ion ($Ca^{2+}$), a Ag ion ($Ag^+$) or an Al ion ($Al^{3+}$) is preferable, a Li ion ($Li^+$), a Na ion ($Na^+$), a K ion ($K^+$), a Cs ion ($Cs^+$), a Mg ion ($Mg^{2+}$) or a Ca ion ($Ca^{2+}$) is more preferable, a Li ion ($Li^-$), a Na ion ($Na^+$), a K ion ($K^+$) is a Cs ion ($Cs^+$) is further preferable.

The substituent which the substituted or unsubstituted ammonium cation represented by M" may have includes, for example, alkyl groups having a number of carbon atoms of 1 to 10 such as a methyl group, an ethyl group, a propyl group, an isopropyl group, a butyl group, an isobutyl group, a sec-butyl group, a tert-butyl group and the like.

The anion represented by M' includes, for example, $F^-$, $Cl^-$, $Br^-$, $I^-$, $OH^-$, $ClO^-$, $ClO_2^-$, $ClO_3^+$, $ClO_4^-$, $SCN^-$, $CN^-$, $NO_3^-$, $SO_4^{2-}$, $HSO_4^-$, $PO_4^{3-}$, $HPO_4^{2-}$, $H_2PO_4^-$, $BF_4^-$, $PF_6^-$, $CH_3SO_3^-$, $CF_3SO_3^-$, $[(CF_3SO_2)_2N]^-$, tetrakis(imidazolyl) borate anion, 8-quinolinolato anion, 2-methyl-8-quinolinolato anion, 2-phenyl-8-quinolinolato anion and the like. As the anion represented by M', preferable is $F^-$, $Cl^-$, $Br^-$, $I^-$, $BF_4^-$, $PF_6^-$, $CH_3SO_3^-$, $CF_3SO_3^-$, $[(CF_3SO_2)_2N]^-$ or tetrakis (imidazolyl)borate anion, more preferable is $BF_4^-$, $PF_6^-$, $CH_3SO_3^-$, $CF_3SO_3^-$, $[(CF_3SO_2)_2N]^-$ or tetrakis(imidazolyl) borate anion, further preferable is $CH_3SO_3^-$, $CF_3SO_3^-$, $[(CF_3SO_2)_2N]^-$ or tetrakis(imidazolyl)borate anion.

The ionic group includes, preferably, a group represented by the formula: —SM",
a group represented by the formula: —OM", a group represented by the formula: —$CO_2$M",
a group represented by the formula: —N$M"_2$, a group represented by the formula: —NRM",
a group represented by the formula: —$PO_3$M", a group represented by the formula: —OP(=O)(OM"$)_2$, a group represented by the formula: —P(=O)(OM"$)_2$, a group represented by the formula: —C(=O)N$M"_2$, a group represented by the formula: —C(=O)NRM",
a group represented by the formula: —$SO_3$M", a group represented by the formula: —$SO_2$M",
a group represented by the formula: —NRM', groups represented by the above-described formula (n-1), (n-5) to (n-8) or (n-13), more preferably, a group represented by the formula: —$CO_2$M", a group represented by the formula: —$PO_3$M",
a group represented by the formula: —OP(=O)(OM"$)_2$, a group represented by the formula: —P(=O)(OM"$)_2$, a group represented by the formula: —$SO_3$M", a group represented by the formula: —$SO_2$M", a group represented by the formula: —$NR_3$M',
groups represented by the above-described formula (n-1), (n-5) or (n-13), further preferably, a group represented by the formula: —COM", a group represented by the formula: —$SO_3$M", a group represented by the formula: —$SO_2$M", a group represented by the formula: —$NR_3$M',
groups represented by the above-described formula (n-1) or (n-5), particularly preferably,
a group represented by the formula: —$CO_2$M" or a group represented by the formula: —$SO_3$M", especially preferably, a group represented by the formula: —$CO_2$M".

The polar group which the polar compound has includes, for example, a carboxyl group, a sulfo group, a hydroxyl group, a mercapto group, an amino group, a hydrocarbylamino group, a dihydrocarbylamino group, a cyano group, a pyrrolidonyl group, a monovalent heterocyclic group and groups represented by the following formulae (I) to (IX), and the like.

$$—O—(R'O)_m—R"  \quad (I)$$

$$—R'''\!\!\begin{array}{c}—O\\(OR')_m\end{array} \quad (II)$$

$$—S—(R'S)_q—R" \quad (III)$$

$$—C(=O)—(R'—C(=O))_q—R" \quad (IV)$$

$$—C(=S)—(R'—C(=S))_q—R" \quad (V)$$

$$—N\{(R')_qR"\}_2 \quad (VI)$$

$$—C(=O)O—(R'—C(=O)O)_q—R" \quad (VII)$$

$$—C(=O)—O—(R'O)_q—R" \quad (VIII)$$

$$—NHC(=O)—(R'NHC(=O))_q—R" \quad (IX)$$

In the formulae (I) to (IX),
R' represents an optionally substituted hydrocarbylene group.
R" represents a hydrogen atom, an optionally substituted hydrocarbyl group, a carboxyl group, a sulfo group, a hydroxyl group, a mercapto group, an amino group, a group represented by the formula: —NR$^c_2$, a cyano group or a group represented by the formula: —C(=O)NR$^c_2$. R$^c$ represents a substituted or unsubstituted alkyl group having a number of carbon atoms of 1 to 30, or a substituted or unsubstituted aryl group having a number of carbon atoms of 6 to 50.

R''' represents an optionally substituted trivalent hydrocarbon group.

m represents an integer of 1 or more. q represents an integer of 0 or more. When there are a plurality of R', they may be the same or different, when there are a plurality of R'', they may be the same or different, and when there are a plurality of R''', they may be the same or different.

The hydrocarbylamino group and the dihydrocarbylamino group denote an amino group obtained by substituting one or two hydrogen atoms constituting an amino group (H$_2$N—) with a hydrocarbyl group (a group represented by the formula: QNH— or Q$_2$N—. Q represents an optionally substituted hydrocarbyl group). The number of carbon atoms of the hydrocarbylamino group is usually 1 to 20.

The hydrocarbylamino group includes, for example, a methylamino group, an ethylamino group, a propylamino group, an isopropylamino group, a butylamino group, an isobutylamino group, a sec-butylamino group, a tert-butylamino group, a pentylamino group, a hexylamino group, a heptylamino group, an octylamino group, a 2-ethylhexylamino group, a nonylamino group, a decylamino group, a 3,7-dimethyloctylamino group, a dodecylamino group, a trifluoromethylamino group, a phenylamino group, a 1-naphthylamino group, a 2-naphthylamino group, a 2-methylphenylamino group, a 3-methylphenylamino group, a 4-methylphenylamino group, a 4-ethylphenylamino group, a 4-propylphenylamino group, a 4-isopropylphenylamino group, a 4-butylphenylamino group, a 4-tert-butylphenylamino group, a 4-hexylphenylamino group, a 4-cyclohexylphenylamino group, a 4-adamantylphenylamino group, a 4-phenylphenylamino group and the like.

The monovalent heterocyclic group is an atomic group remaining after removing, from an optionally substituted heterocyclic compound, one hydrogen atom bonded directly to a carbon atom constituting the ring. The number of carbon atoms constituting the ring of the monovalent heterocyclic group is usually 2 to 25. The heterocyclic ring of the heterocyclic compound includes, for example, monocyclic heterocyclic rings such as a pyridine ring, a 1,2-diazine ring, a 1,3-diazine ring, a 1,4-diazine ring, a 1,3,5-triazine ring, a furan ring, a pyrrole ring, a thiophene ring, a pyrazole ring, an imidazole ring, an oxazole ring, a thiazole ring, an oxadiazole ring, a thiadiazole ring, an azadiazole ring and the like; condensed polycyclic heterocyclic rings obtained by condensation of two or more rings selected from monocyclic aromatic rings; bridged polycyclic aromatic rings having a structure bridging two heterocyclic rings or one heterocyclic ring and one aromatic ring via a divalent group such as a methylene group, an ethylene group, a carbonyl group and the like; etc. As the heterocyclic ring of the heterocyclic compound, a pyridine ring, a 1,2-diazine ring, a 1,3-diazine ring, a 1,4-diazine ring or a 1,3,5-triazine ring is preferable, a pyridine ring or a 1,3,5-triazine ring is more preferable.

The hydrocarbylene group represented by R' in the above-described formulae (I) to (IX) includes, for example, saturated hydrocarbylene groups having a number of carbon atoms of 1 to 50 such as a methylene group, an ethylene group, a 1,2-propylene group, a 1,3-propylene group, a 1,2-butylene group, a 1,3-butylene group, a 1,4-butylene group, a 1,5-pentylene group, a 1,6-hexylene group, a 1,9-nonylene group, a 1,12-dodecylene group and the like; unsaturated hydrocarbylene groups (alkenylene groups) having a number of carbon atoms of 2 to 50 such as an ethenylene group, a propenylene group, a 3-butenylene group, a 2-pentenylene group, a 2-hexenylene group, a 2-nonenylene group, a 2-dodecenylene group and the like; cyclic saturated hydrocarbylene groups having a number of carbon atoms of 3 to 50 such as a cyclopropylene group, a cyclobutylene group, a cyclopentylene group, a cyclohexylene group, a cyclononylene group, a cyclododecylene group, a norbonylene group, an adamantylene group and the like; arylene groups having a number of carbon atoms of 6 to 50 such as a 1,3-phenylene group, a 1,4-phenylene, a 1,4-naphthylene group, a 1,5-naphthylene group, a 2,6-naphthylene group, a biphenyl-4,4'-diyl group and the like; etc.

The hydrocarbylene group represented by R' may have a substituent. The substituent includes, for example, an alkoxy group, an aryloxy group, an amino group, a substituted amino group, a silyl group, a substituted silyl group, a halogen atom, an imine residue, an amide group, an acid imide group, a monovalent heterocyclic group, a mercapto group, a hydroxyl group, a carboxyl group, a cyano group, a nitro group and the like. As the substituent, an amino group, a monovalent heterocyclic group, a mercapto group, a hydroxyl group or a carboxyl group is preferable, an amino group, a pyridyl group, a mercapto group, a hydroxyl group or a carboxyl group is more preferable. When there are a plurality of substituents, the plurality of substituents may be the same or different.

The hydrocarbyl group represented by R'' in the above-described formulae (I) to (IX) includes, for example, alkyl groups having a number of carbon atoms of 1 to 20 such as a methyl group, an ethyl group, a propyl group, an isopropyl group, a butyl group, an isobutyl group, a sec-butyl group, a tert-butyl group, a pentyl group, a hexyl group, a cyclohexyl group, a heptyl group, an octyl group, a nonyl group, a decyl group, a lauryl group and the like; aryl groups having a number of carbon atoms of 6 to 30 such as a phenyl group, a 1-naphthyl group, a 2-naphthyl group, a 1-anthryl group, a 2-anthryl group, a 9-anthryl group and the like; etc.

The hydrocarbyl group represented by R'' is preferably a methyl group, an ethyl group, a phenyl group, a 1-naphthyl group or a 2-naphthyl group, since solubility of the polar compound in a solvent is excellent. The hydrocarbyl group represented by R'' may have a substituent, and this substituent includes the same substituents as the substituent which R' may have. When there are a plurality of substituents, the plurality of substituents may be the same or different.

The optionally substituted trivalent hydrocarbon group represented by R''' in the above-described formulae (I) to (IX) has a number of carbon atoms of usually 1 to 50, preferably 1 to 30. This optionally substituted trivalent hydrocarbon group includes, for example, unsubstituted alkanetriyl groups having a number of carbon atoms of 1 to 20 such as a methanetriyl group, an ethanetriyl group, a 1,2,3-propanetriyl group, a 1,2,4-butanetriyl group, a 1,2,5-pentanetriyl group, a 1,3,5-pentanetriyl group, a 1,2,6-hexanetriyl group, a 1,3,6-hexanetriyl group and the like and substituted alkanetriyl groups obtained by substituting at least one hydrogen atom in these groups; unsubstituted trivalent aromatic groups having a number of carbon atoms of 6 to 30 such as a 1,2,3-benzenetriyl group, a 1,2,4-benzenetriyl group, a 1,3,5-benzenetriyl group and the like and trivalent aromatic groups obtained by substituting at least one hydrogen atom in these groups; and a methanetriyl group, an ethanetriyl group, a 1,2,4-benzenetriyl group or a 1,3,5-benzenetriyl group is preferable since solubility of the polar compound in a solvent is excellent.

In the above-described formulae (I) to (IX), $R^c$ is preferably a methyl group, an ethyl group, a phenyl group, a 1-naphthyl group or a 2-naphthyl group since solubility of the polar compound in a solvent is excellent.

In the above-described formulae (I) and (II), m is preferably 1 to 20, more preferably 3 to 20, further preferably 3 to 15, particularly preferably 6 to 10.

In the above-described formula (III), among the above-described formulae (III) to (IX), q is preferably 0 to 30, more preferably 3 to 20, further preferably 3 to 10, particularly preferably 6 to 10.

In the above-described formulae (IV) to (VII), q is preferably 0 to 30, more preferably 0 to 20, further preferably 0 to 10, particularly preferably 0 to 5. In the above-described formula (VIII), q is preferably 0 to 30, more preferably 0 to 20, further preferably 3 to 20, particularly preferably 3 to 10. In the above-described formula (IX), q is preferably 0 to 30, more preferably 0 to 20, further preferably 0 to 15, particularly preferably 0 to 10.

The polar group is, preferably a carboxyl group, a sulfo group, a hydroxyl group, a mercapto group, an amino group, a hydrocarbylamino group, a cyano group, a pyrrolidonyl group, a monovalent heterocyclic group, a group represented by the above-described formula (I) or a group represented by the above-described formula (II), more preferably a carboxyl group, a sulfo group, a hydroxyl group, a mercapto group, an amino group, a hydrocarbylamino group, a cyano group, a pyrrolidonyl group, a pyridyl group, a 1,3,5-triazyl group or a group represented by the above-described formula (I), further preferably a carboxyl group, a sulfo group, a mercapto group, an amino group, a pyrrolidonyl group, a pyridyl group or a group represented by the above-described formula (I), particularly preferably a carboxyl group, a mercapto group, an amino group, a pyrrolidonyl group, a pyridyl group or a group represented by the above-described formula (I), particularly preferably a carboxyl group, a mercapto group, a pyridyl group or a group represented by the above-described formula (I), especially preferably a group represented by the above-described formula (I).

It is preferable that the ionic compound and/or the polar compound has a constitutional unit represented by the following formula (XI).

In the formula (XI), $Ar^2$ represents a $(n^2+2)$-valent aromatic group, $R^2$ represents a direct bond or a $(m^2+1)$-valent group, $X^2$ represents a group containing an ionic group or a polar group.

$m^2$ and $n^2$ represent each independently an integer of 1 or more, and when $R^2$ is a direct bond, $m^2$ is 1. When there are a plurality of $R^2$, they may be the same or different, when there are a plurality of $X^2$, they may be the same or different, and when there are a plurality of $m^2$, they may be the same or different.

The $(n^2+2)$-valent aromatic group represented by $Ar^2$ in the formula (XI) is an atomic group (residue) remaining after removing, from an aromatic compound, $(n^2+2)$ hydrogen atoms bonded directly to carbon atoms constituting the aromatic ring. The $(n^2+2)$-valent aromatic group may have a substituent.

Examples of the aromatic compound include aromatic compounds represented by the following formulae (1) to (95). Of these aromatic compounds, aromatic compounds represented by the following formula (1) to (12), (15) to (22), (24) to (31), (37) to (40), (43) to (46), (49), (50), (59) to (76) or (92) to (95) are preferable, aromatic compounds represented by the formula (1) to (3), (8) to (10), (15) to (21), (24) to (31), (37), (39), (43) to (45), (49), (50), (59) to (76) or (92) to (95) are more preferable, aromatic compounds represented by the formula (1) to (3), (8), (10), (15), (17), (21), (24), (30), (59), (60) or (61) are further preferable, aromatic compounds represented by the formula (1) to (3), (8), (10) or (59) are particularly preferable, aromatic compounds represented by the formula (1), (2), (8) or (59) are especially preferable, because of easy synthesis thereof.

(1)

(2)

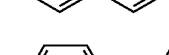

(3)

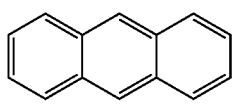

(4)

(5)

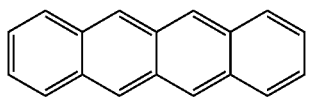

(6)

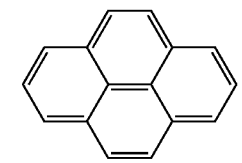

(7)

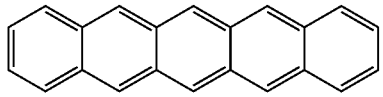

(8)

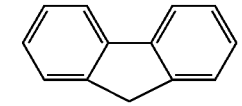

-continued
(9)
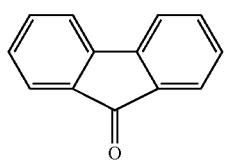
(10)
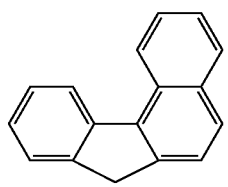
(11)
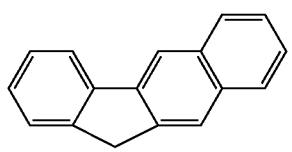
(12)
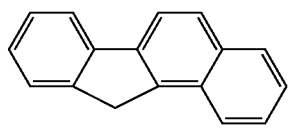
(13)
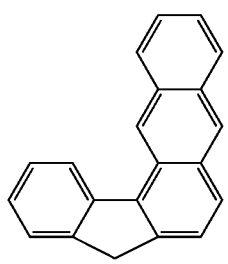
(14)
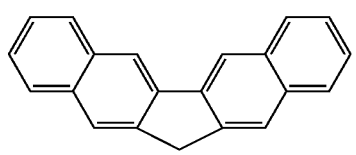
(15)
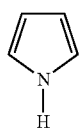
(16)
(17)
(18)
(19)
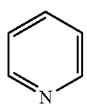
(20)
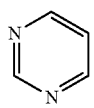
(21)
(22)
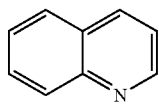
(23)
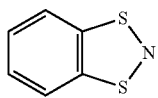
(24)
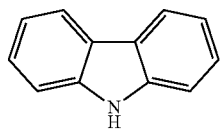
(25)
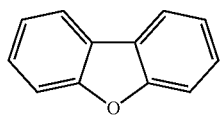
(26)
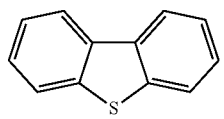
(27)
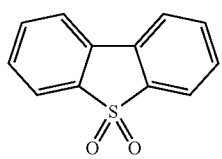
(28)
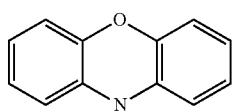

-continued
(29) 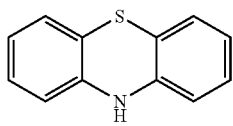
(30) 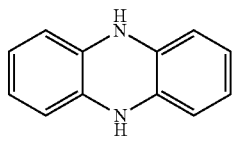
(31) 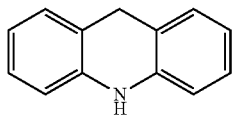
(32) 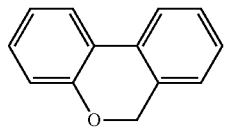
(33) 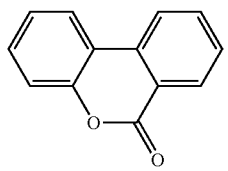
(34) 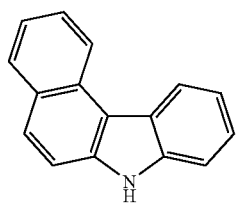
(35) 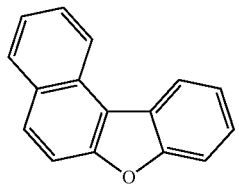
(36) 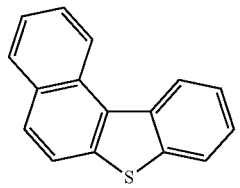
(37) 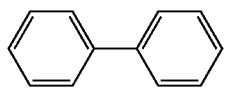
(38) 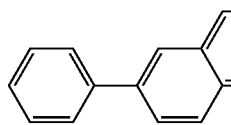
(39) 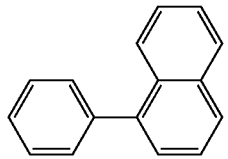
(40) 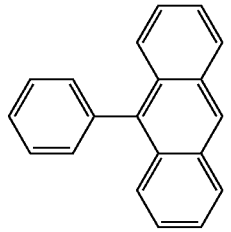
(41) 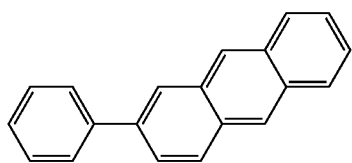
(42) 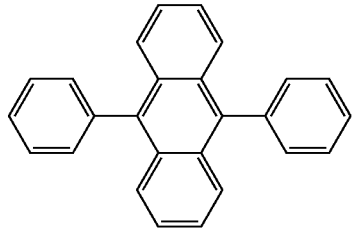
(43) 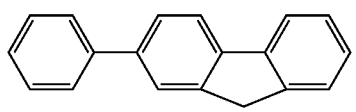
(44) 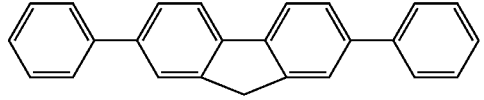
(45) 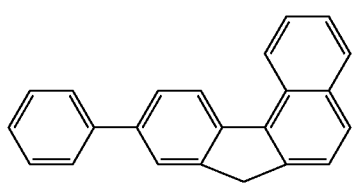
(46) 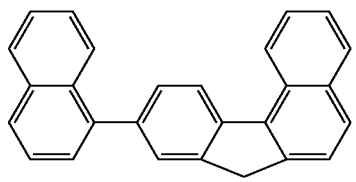

(47)
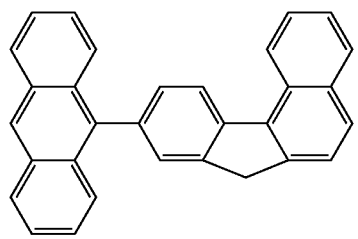
(48)
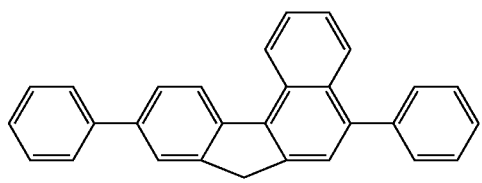
(49)
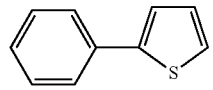
(50)
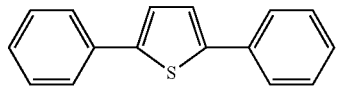
(51)
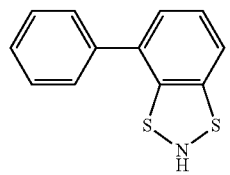
(52)
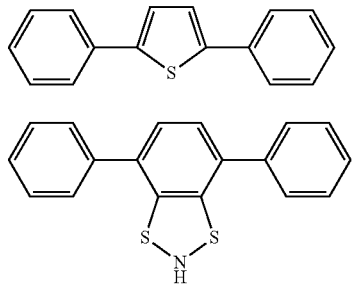
(53)
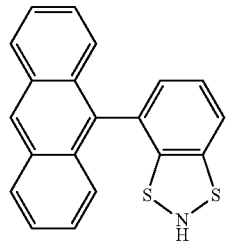
(54)
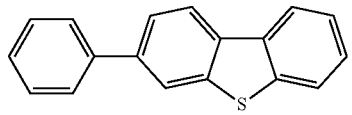
(55)
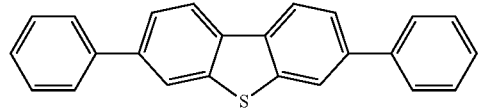
(56)
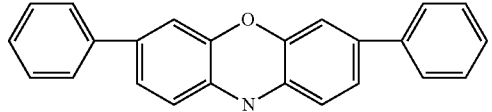
(57)
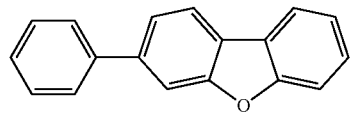
(58)
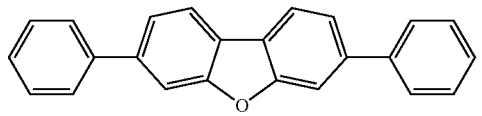
(59)
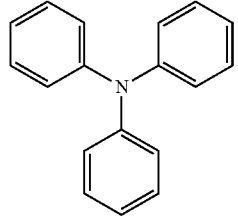
(60)
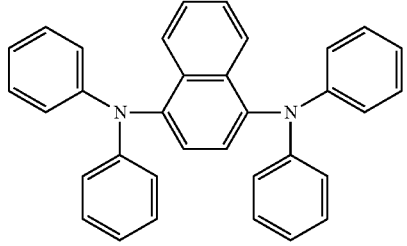
(61)
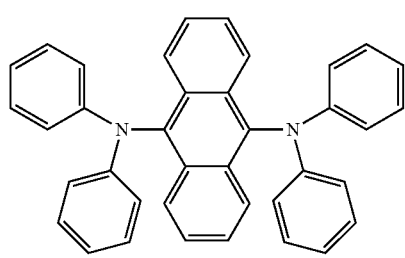
(62)
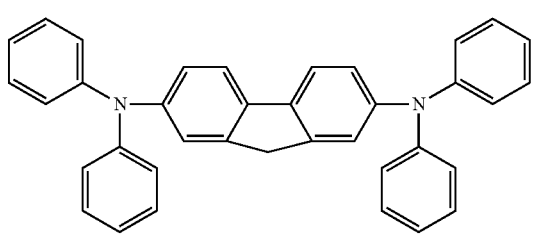

-continued
(63)
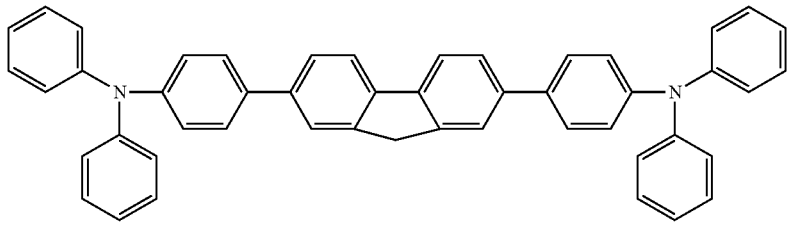
(64)
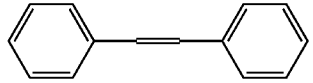
(65)
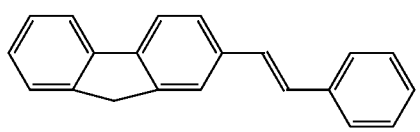
(66)
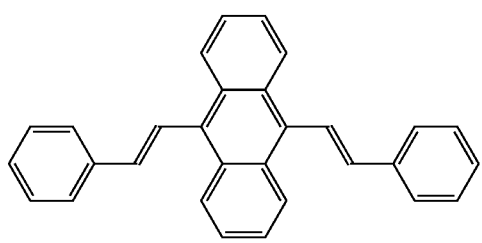
(67)
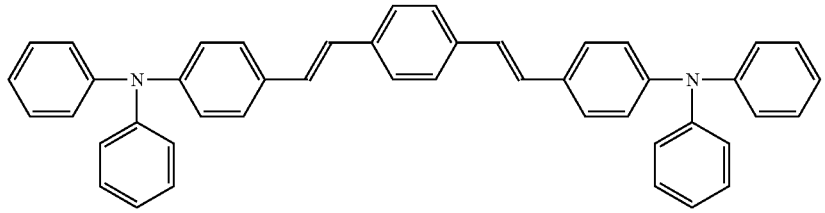
(68)
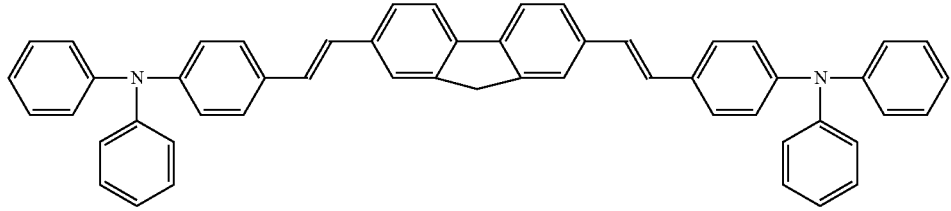
(69)
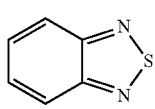
(70)
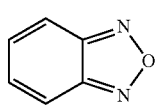
(71)
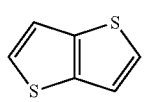
(72)
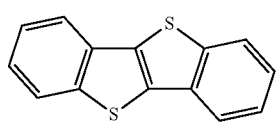
(73)
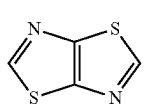
(74)
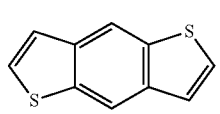
(75)
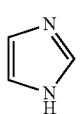
(76)
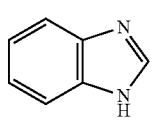
(77)

-continued

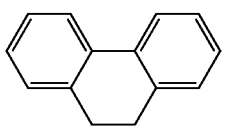 (78)

 (80)

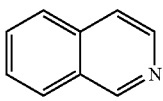 (82)

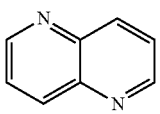 (84)

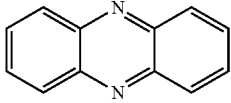 (86)

 (88)

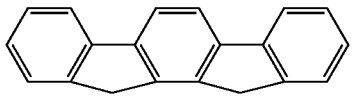 (92)

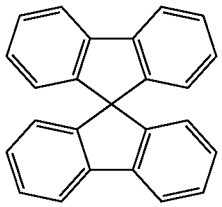 (94)

(79)

(81)

(83)

(85)

(87)

(89)

(91)

(93)

(95)

One or more hydrogen atoms bonded directly to carbon atoms constituting the ring in these aromatic compounds may be substituted with a substituent. Examples of the substituent include a halogen atom, an optionally substituted hydrocarbyl group, a mercapto group, a mercaptocarbonyl group, a mercaptothiocarbonyl group, an optionally substituted hydrocarbylthio group, an optionally substituted hydrocarbylthiocarbonyl group, an optionally substituted hydrocarbyldithio group, a hydroxyl group, an optionally substituted hydrocarbyloxy group, carboxyl group, an optionally substituted hydrocarbylcarbonyl group, an amino group, a hydrocarbylamino group in which a hydrogen atom in the hydrocarbyl group may be substituted with a substituent, a dihydrocarbylamino group in which a hydrogen atom in the hydrocarbyl group may be substituted with a substituent, a phosphino group, a hydrocarbylphosphino group in which a hydrogen atom in the hydrocarbyl group may be substituted with a substituent, a dihydrocarbylphosphino group in which a hydrogen atom in the hydrocarbyl group may be substituted with a substituent, a trihydrocarbylphosphino group in which a hydrogen atom in the hydrocarbyl group may be substituted with a substituent, an optionally substituted monovalent heterocyclic group, a formyl group, an optionally substituted hydrocarbyloxycarbonyl group, an optionally substituted hydrocarbylcarbonyloxy group, a nitro group, a group represented by the formula: —OP(=O)(OH)$_2$, a group represented by the formula: —P(=O)(OH)$_2$, a hydrocarbylcarbamoyl group in which a hydrogen atom in the carbamoyl group and/or the hydrocarbyl group may be substituted with a substituent, a dihydrocarbylcarbamoyl group in which a hydrogen atom in the hydrocarbyl group may be substituted with a substituent, a group represented by the formula: —C(=S)NR$_2$, a group represented by the formula: —B(OH)$_2$, a group represented by the formula: —BR$_2$, a borate ester residue, a group represented by the formula: —Si(OR)$_3$, a sulfo group, an optionally substituted hydrocarbylsulfo group, an optionally substituted hydrocarbylsulfonyl group, a sulphino group, an optionally substituted hydrocarbylsulphino group, a group represented by the formula: —NRC(=O)OR, a group represented by the formula: —NRC(=O)SR, a group represented by the formula: —NRC(=S)OR, a group represented by the formula: —NRC(=S)SR, a group represented by the formula: —OC(=O)NR$_2$, a group represented by the formula: —SC(=O)NR$_2$, a group represented by the formula: —OC(=S)NR$_2$, a group represented by the formula: —SC(=S)NR$_2$, a group represented by the formula: —NRC(=O)NR$_2$, and a group represented by the formula: —NRC(=S)NR$_2$.

In the formulae, R represents a hydrogen atom or an optionally substituted hydrocarbyl group. A plurality of substituents may be mutually linked to form a ring together with atoms to which they are linked.

The halogen atom includes, for example, a fluorine atom, a chlorine atom, a bromine atom and an iodine atom. As the halogen atom, a fluorine atom, a chlorine atom or a bromine atom is preferable.

The hydrocarbyl group includes, for example, alkyl groups having a number of carbon atoms of 1 to 50 such as a methyl group, an ethyl group, a propyl group, an isopropyl group, a butyl group, an isobutyl group, a sec-butyl group, a tert-butyl group, a pentyl group, a hexyl group, a nonyl group, a dodecyl group, a pentadecyl group, an octadecyl group, a docosyl group and the like; cyclic saturated hydrocarbyl groups having 3 to 50 carbon atoms such as a cyclopropyl group, a cyclobutyl group, a cyclopentyl group, a cyclohexyl group, a cyclononyl group, a cyclododecyl group, a norbonyl group, an adamantyl group and the like; alkenyl groups having a number of carbon atoms of 2 to 50 such as an ethenyl group, a propenyl group, a 3-butenyl group, a 2-butenyl group, a 2-pentenyl group, a 2-hexenyl group, a 2-nonenyl group, a 2-dodecenyl group and the like; aryl groups having a number of carbon atoms of 6 to 50 such as a phenyl group, a 1-naphthyl group, a 2-naphthyl group, a 2-methylphenyl group, a 3-methylphenyl group, a 4-methylphenyl group, a 4-ethylphenyl group, a 4-propylphenyl group, a 4-isopropylphenyl group, a 4-butylphenyl group, a 4-tert-butylphenyl group, a 4-hexylphenyl group, a 4-cyclohexylphenyl group, a 4-adamantylphenyl group, a 4-phenylphenyl group and the like; arylalkyl groups having a number of carbon atoms of 7 to 50 such as a phenylmethyl group, a 1-phenyleneethyl group, a 2-phenylethyl group, a 1-phenyl-1-propyl group, a 1-phenyl-2-propyl group, a 2-phenyl-2-propyl group, a 3-phenyl-1-propyl group, a 4-phenyl-1-butyl group, a 5-phenyl-1-pentyl group, a 6-phenyl-1-hexyl group and the like. As the hydrocarbyl group, alkyl groups having a number of carbon atoms of 1 to 50 or aryl groups having a number of carbon atoms of 6 to 50 are preferable, alkyl groups having a number of carbon atoms of 1 to 12 or aryl groups having a number of carbon atoms of 6 to 18 are more preferable, alkyl groups having a number of carbon atoms of 6 to 12 or aryl groups having a number of carbon atoms of 6 to 12 are further preferable.

The hydrocarbylthio group is a group obtained by linking one hydrocarbyl group to a thio group (—S—) (a group represented by the formula: QS—. Q represents an optionally substituted hydrocarbyl group).

The hydrocarbylthiocarbonyl group is a group obtained by linking one hydrocarbyl group to a thiocarbonyl group (—C(=S)—) (QC(=S)—. Q represents an optionally substituted hydrocarbyl group).

The hydrocarbyldithio group is a group obtained by linking one hydrocarbyl group to a dithio group (—S—S—) (a group represented by the formula: QS—S—. Q represents an optionally substituted hydrocarbyl group).

The hydrocarbyloxy group is a group obtained by linking one hydrocarbyl group to an oxy group (—O—) (a group represented by the formula: QO—. Q represents an optionally substituted hydrocarbyl group).

The hydrocarbylcarbonyl group is a group obtained by linking one hydrocarbyl group to a carbonyl group (—(C=O)—) (a group represented by the formula: R(C=O)—. Q represents an optionally substituted hydrocarbyl group).

The hydrocarbyloxycarbonyl group is a group obtained by linking a hydrocarbyl group, an oxy group (—O—) and a carbonyl group in this order (a group represented by the formula: Q-O—(C=O)—. Q represents an optionally substituted hydrocarbyl group).

The hydrocarbylcarbonyloxy group is a group obtained by linking a hydrocarbyl group, a carbonyl group (—(C=O)—) and an oxy group (—O—) in this order (a group represented by the formula: Q-(C=O)—O—. Q represents an optionally substituted hydrocarbyl group).

The hydrocarbylamino group and the dihydrocarbylamino group denote a group obtained by substituting one or two hydrogen atoms constituting the amino group (—NH$_2$) with a hydrocarbyl group (a group represented by the formula: QNH— or Q$_2$N—. Q represents an optionally substituted hydrocarbyl group).

The hydrocarbylphosphino group, the dihydrocarbylphosphino group and the trihydrocarbylphosphino group denote a group obtained by substituting one, two or three hydrogen atoms constituting the phosphino group (H$_3$P—) with a hydrocarbyl group (a group represented by the formula: QPH$_2$—, Q$_2$PH— or Q$_2$P—. Q represents an optionally substituted hydrocarbyl group).

The hydrocarbylcarbamoyl group and the dihydrocarbylcarbamoyl group denote a group obtained by substituting one or two hydrogen atoms constituting the carbamoyl group (H$_2$N—C(=O)—) with a hydrocarbyl group (a group represented by the formula: QHNC(=O)— or Q$_2$NC(=O)—. Q represents an optionally substituted hydrocarbyl group).

The borate ester residue includes, for example, groups selected from the following formulae.

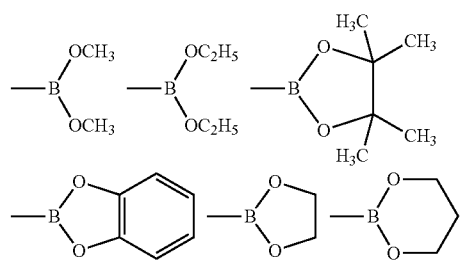

The hydrocarbylsulfo group is a group obtained by substituting one hydrogen atom constituting the sulfo group (—SO$_3$H) with a hydrocarbyl group (a group represented by the formula: —SO$_2$Q. Q represents an optionally substituted hydrocarbyl group).

The hydrocarbylsulfonyl group is a group obtained by linking one hydrocarbyl group to the sulfonyl group (—S(=O)$_2$—) (a group represented by the formula: Q-S(=O)$_2$—. represents an optionally substituted hydrocarbyl group).

The hydrocarbylsulphino group is a group obtained by substituting one hydrogen atom constituting the sulphino group (—S(=O)—OH) with a hydrocarbyl group (a group represented by the formula: —S(=O)—OQ. Q represents an optionally substituted hydrocarbyl group).

The optionally substituted monovalent heterocyclic group is an atomic group remaining after removing, from an optionally substituted heterocyclic compound, one hydrogen atom bonded directly to a carbon atom constituting the ring. The number of carbon atoms constituting the ring of the monovalent heterocyclic group is usually 2 to 25. Examples of the heterocyclic ring of the heterocyclic compound include monocyclic heterocyclic ring such as a pyridine ring, a 1,2-diazine ring, a 1,3-diazine ring, a 1,4-diazine ring, a 1,3,5-triazine ring, a furan ring, a pyrrole ring, a thiophene ring, a pyrazole ring, an imidazole ring, an oxazole ring, a thiazole ring, an oxadiazole ring, a thiadiazole ring, an azadiazole ring and the like; condensed polycyclic heterocyclic rings obtained by condensation of two or more rings selected from monocyclic aromatic rings; bridged polycyclic aromatic rings having a structure bridging two heterocyclic rings or one heterocyclic ring and one aromatic ring via a divalent group such as a methylene group, an ethylene group, a carbonyl group and the like; preferably a pyridine ring, a 1,2-diazine ring, a 1,3-diazine ring, a 1,4-diazine ring or a 1,3,5-triazine ring, more preferably a pyridine ring or a 1,3,5-triazine ring.

Among substituents which the heterocyclic compound may have, preferable is a halogen atom, an optionally substituted hydrocarbyl group, a mercapto group, an optionally substituted hydrocarbylthio group, an optionally substituted hydrocarbyldithio group, a hydroxyl group, an optionally substituted hydrocarbyloxy group, a carboxyl group, an optionally substituted hydrocarbylcarbonyl group, an amino group, a hydrocarbylamino group in which a hydrogen atom in the hydrocarbyl group may be substituted with a substituent, an optionally substituted dihydrocarbylamino group, a group represented by the formula: —OP(=O)(OH)$_2$, a sulfo group or an optionally substituted monovalent heterocyclic group, more preferable is a halogen atom, an optionally substituted hydrocarbyl group, a mercapto group, a hydroxyl group, an optionally substituted hydrocarbyloxy group, a carboxyl group, an amino group, a group represented by the formula: —P(=O)(OH)$_2$, a sulfo group or an optionally substituted monovalent heterocyclic group, further preferable is an optionally substituted hydrocarbyl group, a mercapto group, an optionally substituted hydrocarbyloxy group, a carboxyl group or an optionally substituted pyridyl group, particularly preferable is an optionally substituted hydrocarbyl group or an optionally substituted hydrocarbyloxy group.

The group containing an ionic group or a polar group represented by X$^2$ in the formula (XI) is a group containing the above-described ionic group or the above-described polar group, and the definitions of the ionic group, the definitions of the polar group, specific examples thereof and preferable examples thereof are as described above.

The (m$^2$+1)-valent group represented by R$^2$ in the formula (XI) includes, for example, an optionally substituted hydrocarbyl group, an atomic group remaining after removing, from an optionally substituted monovalent heterocyclic group, m$^2$ hydrogen atoms bonded directly to carbon atoms constituting the ring, and a group represented by the formula: —O—(R'O)$_m$—. These groups may be mutually linked to form a ring. The (m$^2$+1)-valent group is preferably an atomic group remaining after removing m$^2$ hydrogen atoms from an optionally substituted alkyl group, an atomic group remaining after removing, from an optionally substituted aryl group, m$^2$ hydrogen atoms bonded directly to carbon atoms constituting the ring, an atomic group remaining after removing, from an optionally substituted monovalent heterocyclic group, m$^2$ hydrogen atoms bonded directly to carbon atoms constituting the ring, an atomic group remaining after removing m$^2$ hydrogen atoms from an alkyl group substituted with a monovalent heterocyclic group or an atomic group remaining after removing, from an aryl group substituted with a monovalent heterocyclic group, m$^2$ hydrogen atoms bonded directly to carbon atoms constituting the ring, more preferably an atomic group remaining after removing m$^2$ hydrogen atoms from an alkyl group having a number of carbon atoms of 1 to 6, an atomic group remaining after removing, from a phenyl group, m$^2$ hydrogen atoms bonded directly to carbon atoms constituting the ring, an atomic group remaining after removing, from a triazinyl group, m$^2$ hydrogen atoms bonded directly to carbon atoms constituting the ring, an atomic group remaining after removing hydrogen atoms from an alkyl group substituted with a triazinyl group or an atomic group remaining after removing, from an aryl group substituted with a triazinyl group, m$^2$ hydrogen atoms bonded directly to carbon atoms constituting the ring, further preferably an atomic group remaining after removing m$^2$ hydrogen atoms from a hexyl group, an atomic group remaining after removing, from a phenyl group, m$^2$ hydrogen atoms bonded directly to carbon atoms constituting the ring or an atomic group remaining after removing, from a phenyl group substituted with a triazinyl group, m$^2$ hydrogen atoms bonded directly to carbon atoms constituting the ring.

In the formulae, the definitions, specific examples and preferable examples of R' and m are the same as the definitions, specific examples and preferable examples of R' and m in the formula (I).

The ionic compound and the polar compound contained in the composition for forming a conductive film of the present invention are preferably a polymer compound, more preferably a polymer compound having a polystyrene-equivalent number-average molecular weight of $1 \times 10^3$ to $1 \times 10^7$, further preferably a polymer compound having a polystyrene-equivalent number-average molecular weight of $1 \times 10^3$ to $1 \times 10^6$. In the present invention, the polystyrene-equivalent number-average molecular weight and weight-average molecular weight can be determined using gel permeation chromatography (GPC).

The ionic compound and/or the polar compound contained in the composition for forming a conductive film of the present invention is preferably an ionic compound since when the composition is used as an electrode of an electronic device, electron injectability is excellent.

Examples of the ionic compound and/or the polar compound contained in the composition for forming a conductive film of the present invention include conjugated compounds having an ionic group and/or a polar group, and preferable are conjugated compounds containing a constitutional unit represented by (X1).

Specific examples of the conjugated compound containing a constitutional unit represented by (X1) include, for example, conjugated compounds having constitutional units represented by the following formulae (c-1) to (c-37), (d-1) to (d-47), (e-1) to (e-16), (f-1) to (f-35) and (g-1) to (g-24). In these formulae, $n^3$ represents an integer of 2 or more, preferably an integer of 2 to 30, more preferably an integer of 2 to 20, further preferably an integer of 6 to 10. $n^4$ represents an integer of 1 or more, preferably an integer of 1 to 10, further preferably an integer of 2 to 6. In these formulae, R represents a hydrogen atom or an optionally substituted hydrocarbyl group. R is preferably an alkyl group having a number of carbon atoms of 1 to 6, more preferably a methyl group, an ethyl group, a propyl group or a butyl group.

In these specific examples of the constitutional unit which the conjugated compound has, one or more hydrogen atoms in the constitutional unit may be substituted with a substituent, and the definitions, specific examples and preferable examples of the substituent are as described above.

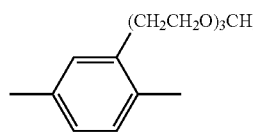
(c-1)

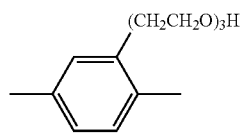
(c-2)

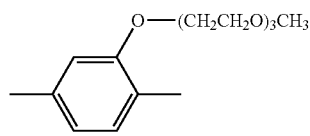
(c-3)

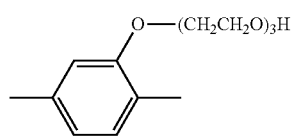
(c-4)

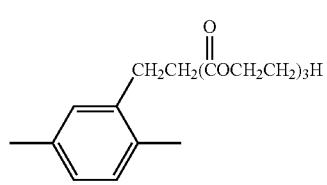
(c-5)

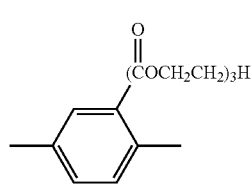
(c-6)

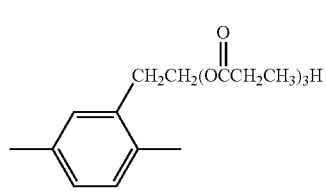
(c-7)

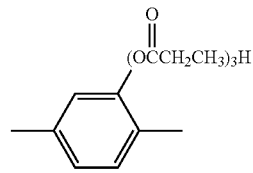
(c-8)

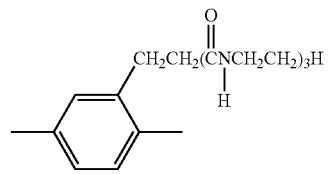
(c-9)

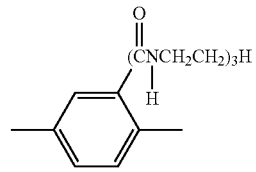
(c-10)

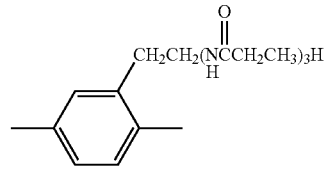
(c-11)

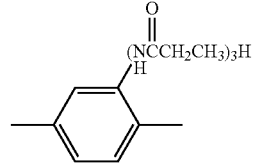
(c-12)

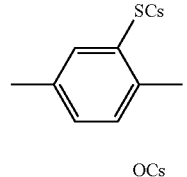
(c-13)

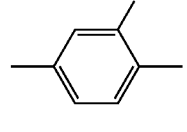
(c-14)

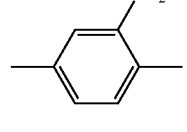
(c-15)

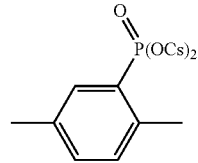
(c-16)

(c-17) 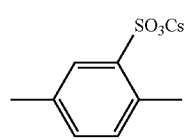
(c-18) 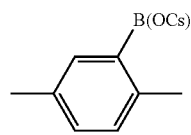
(c-19) 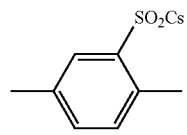
(c-20) 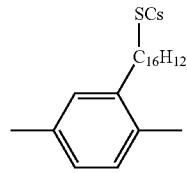
(c-21) 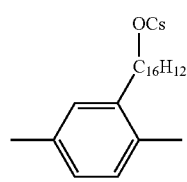
(c-22) 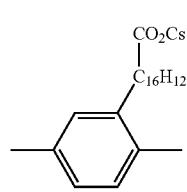
(c-23) 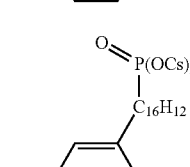
(c-24) 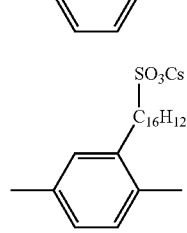
(c-25) 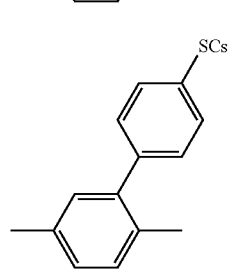
(c-26) 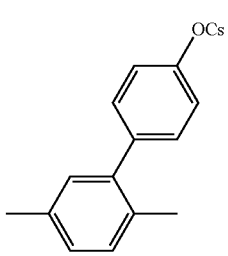
(c-27) 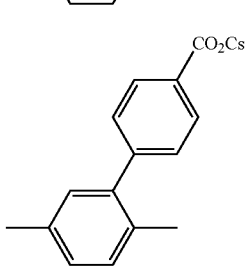
(c-28) 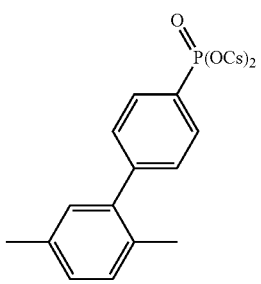
(c-29) 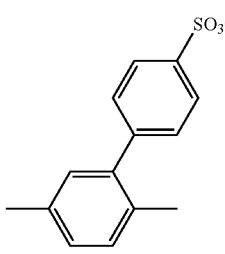
(c-30) 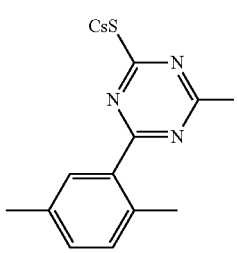
(c-31) 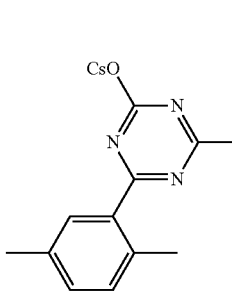

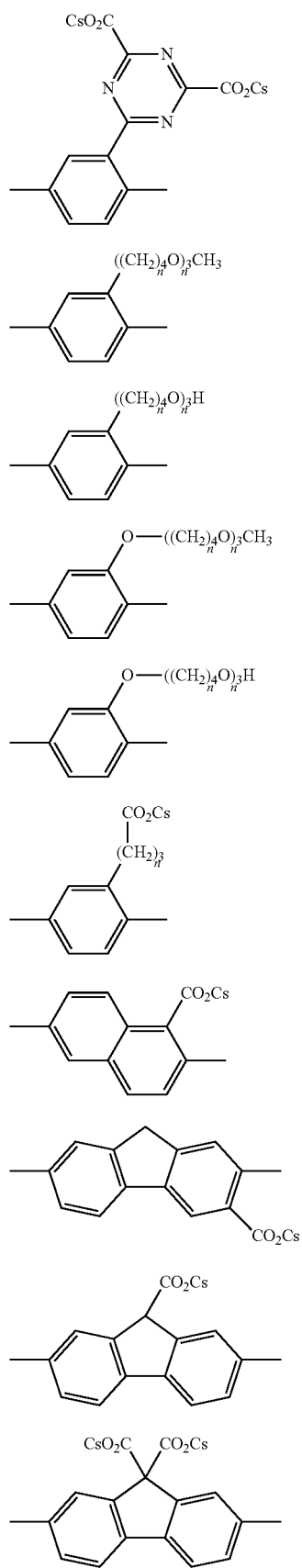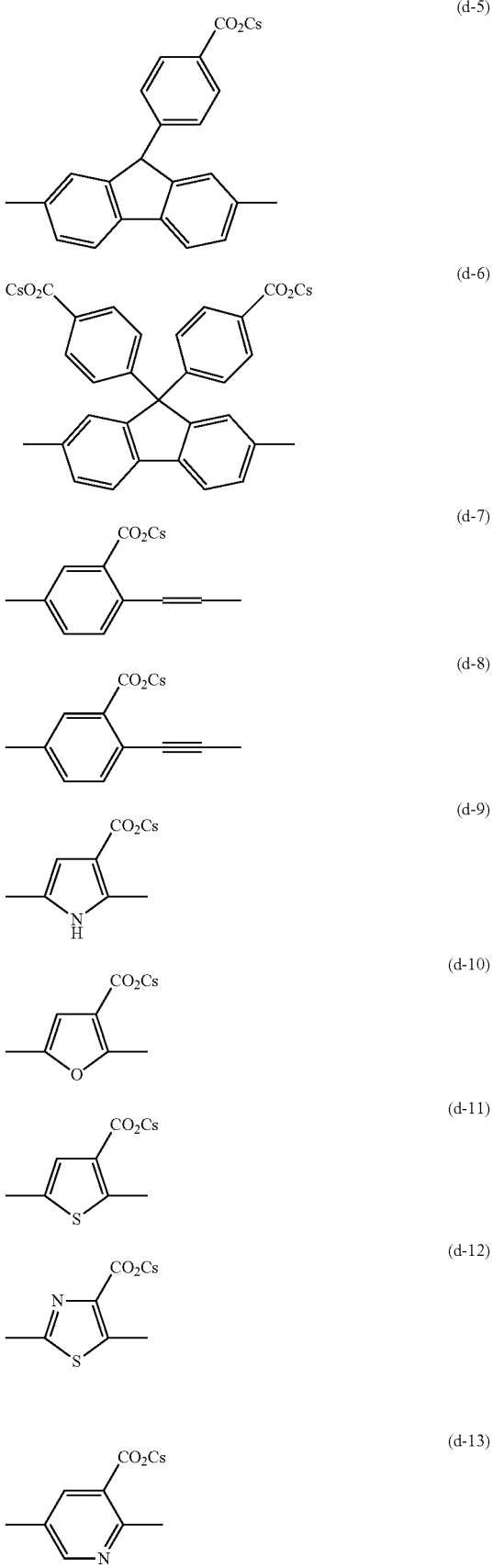

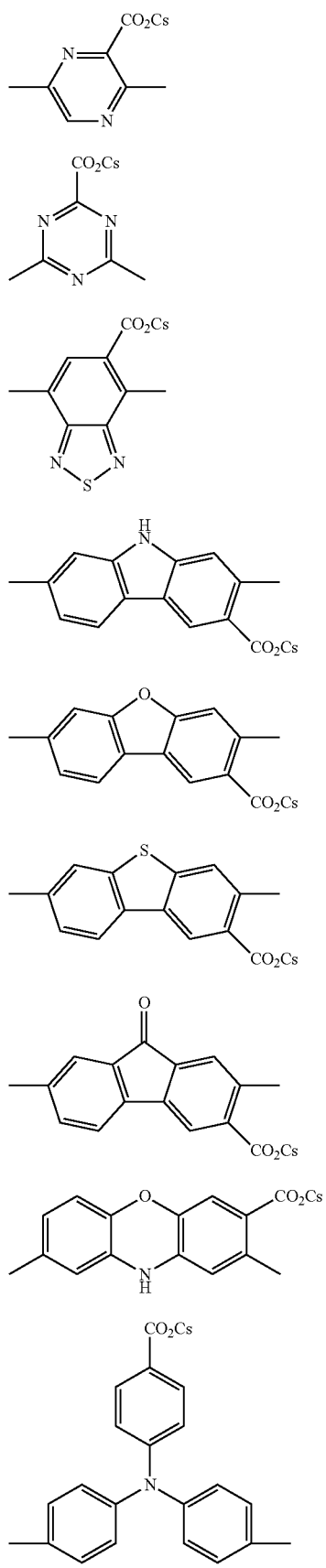
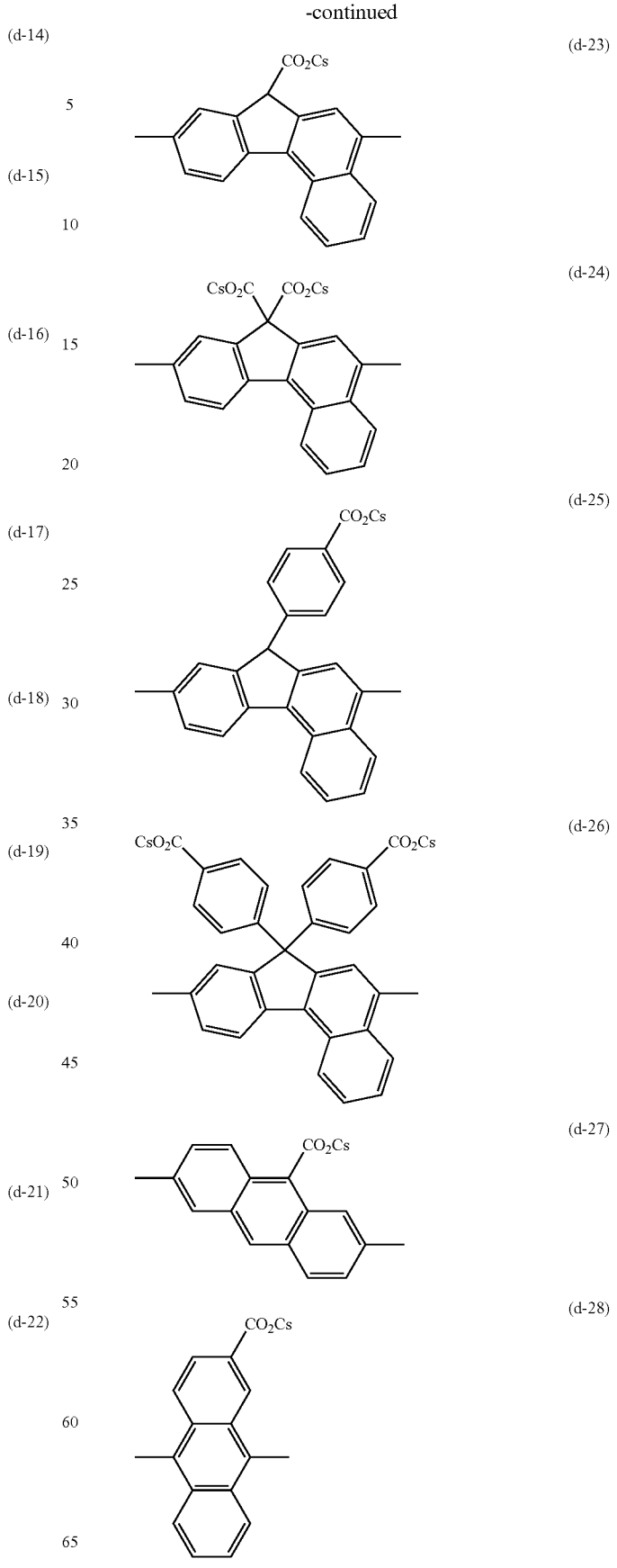

(d-29) 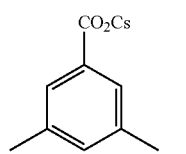
(d-30) 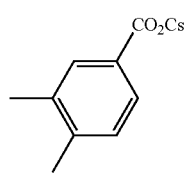
(d-31) 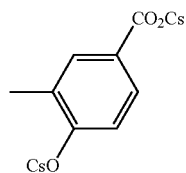
(d-32) 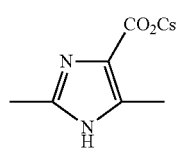
(d-33) 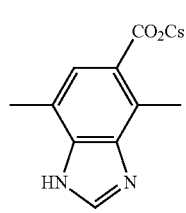
(d-34) 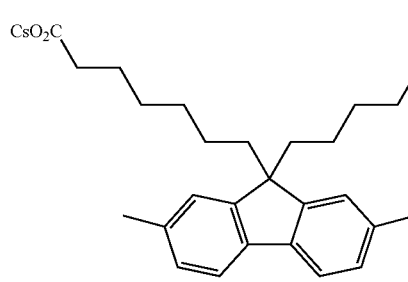
(d-35) 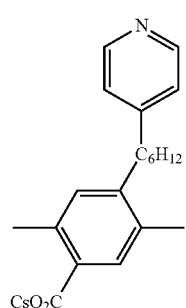
(d-36) 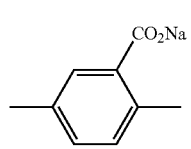
(d-37) 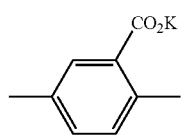
(d-38) 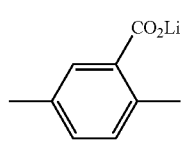
(d-39) 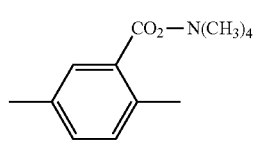
(d-40) 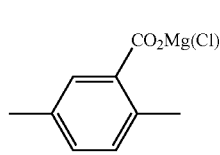
(d-41) 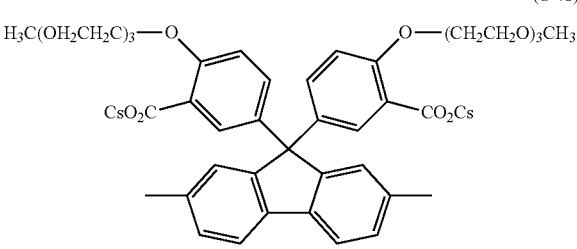
(d-42) 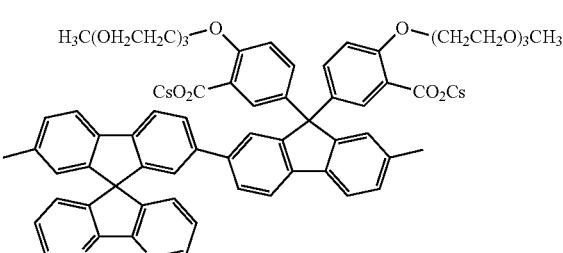
(d-43) 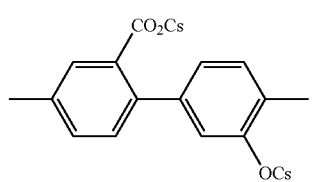
(d-44) 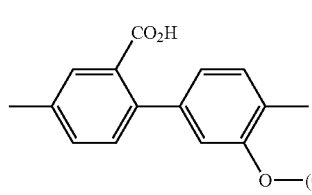

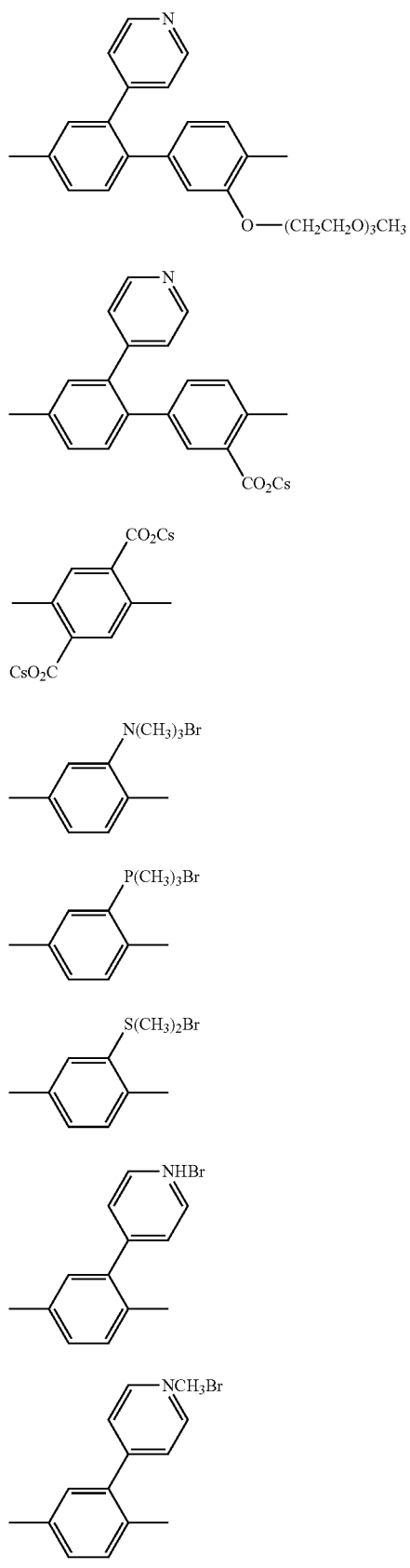
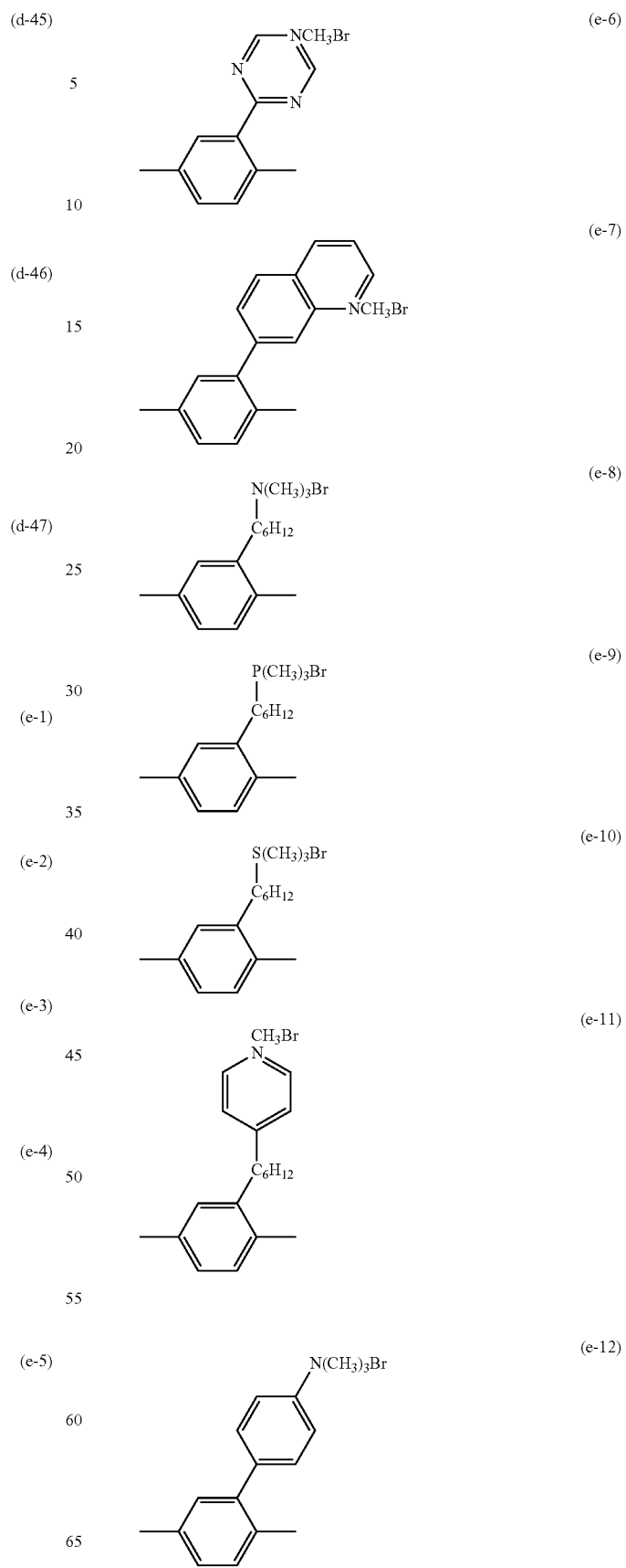

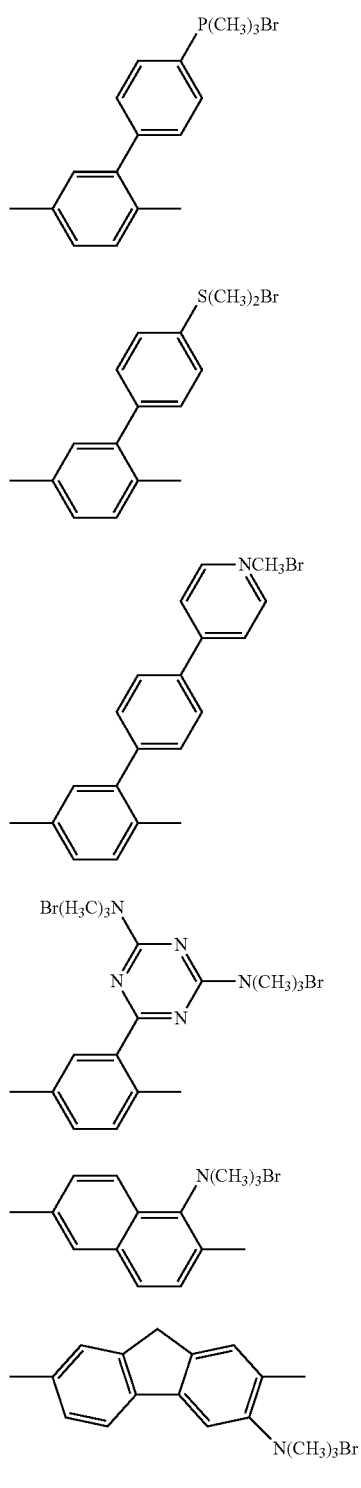
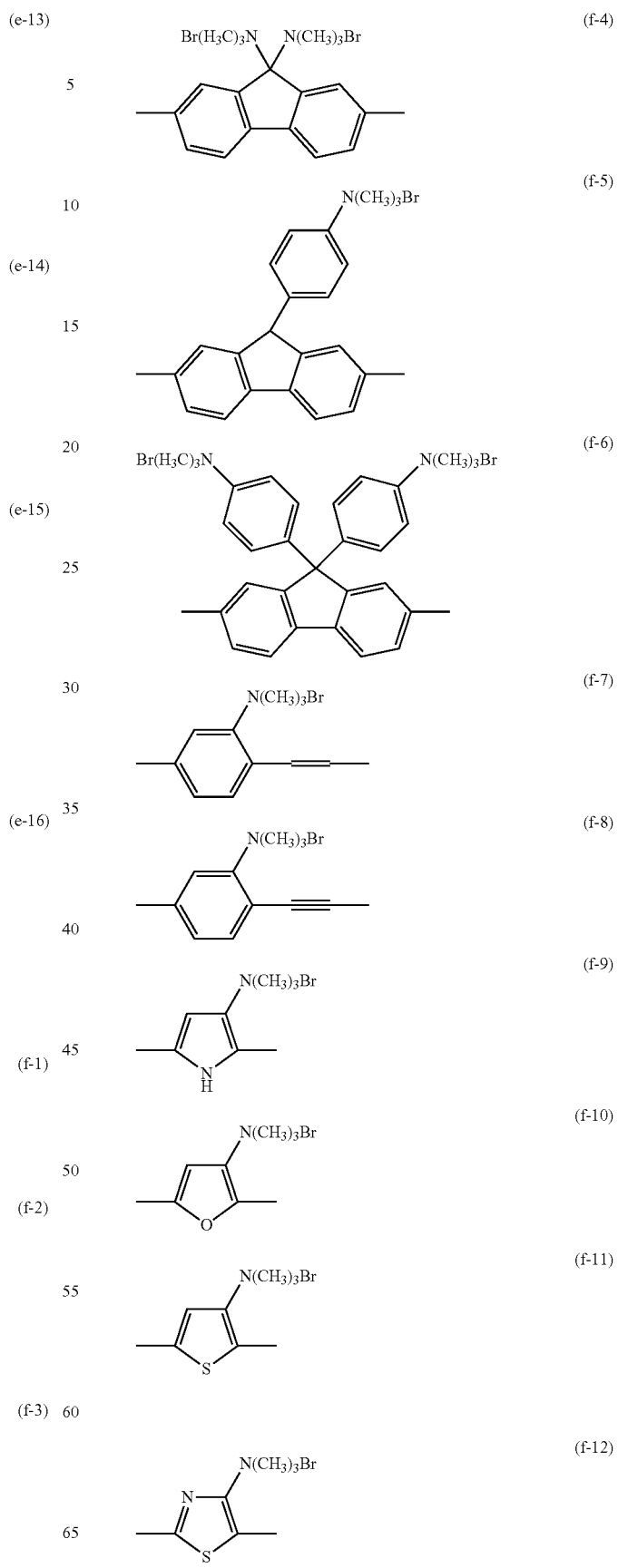

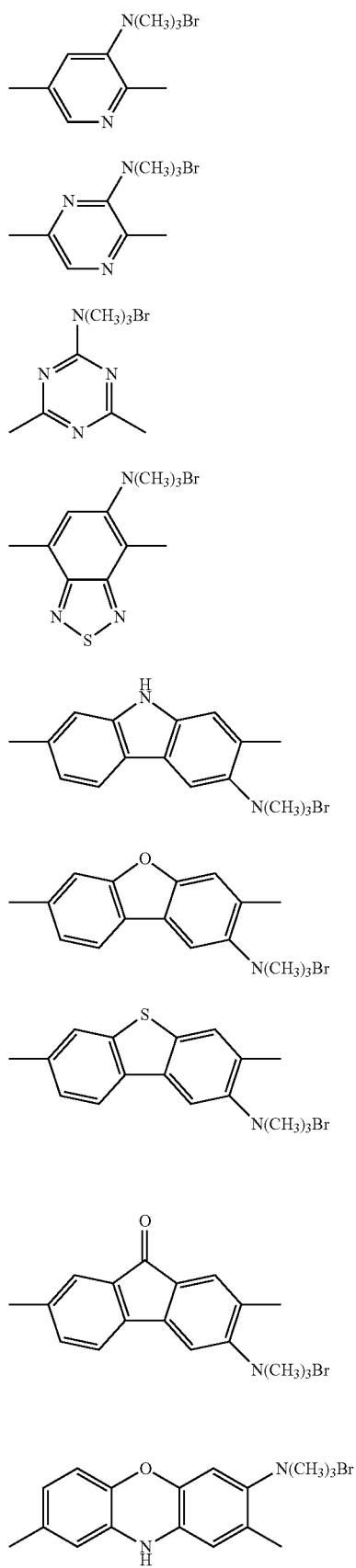
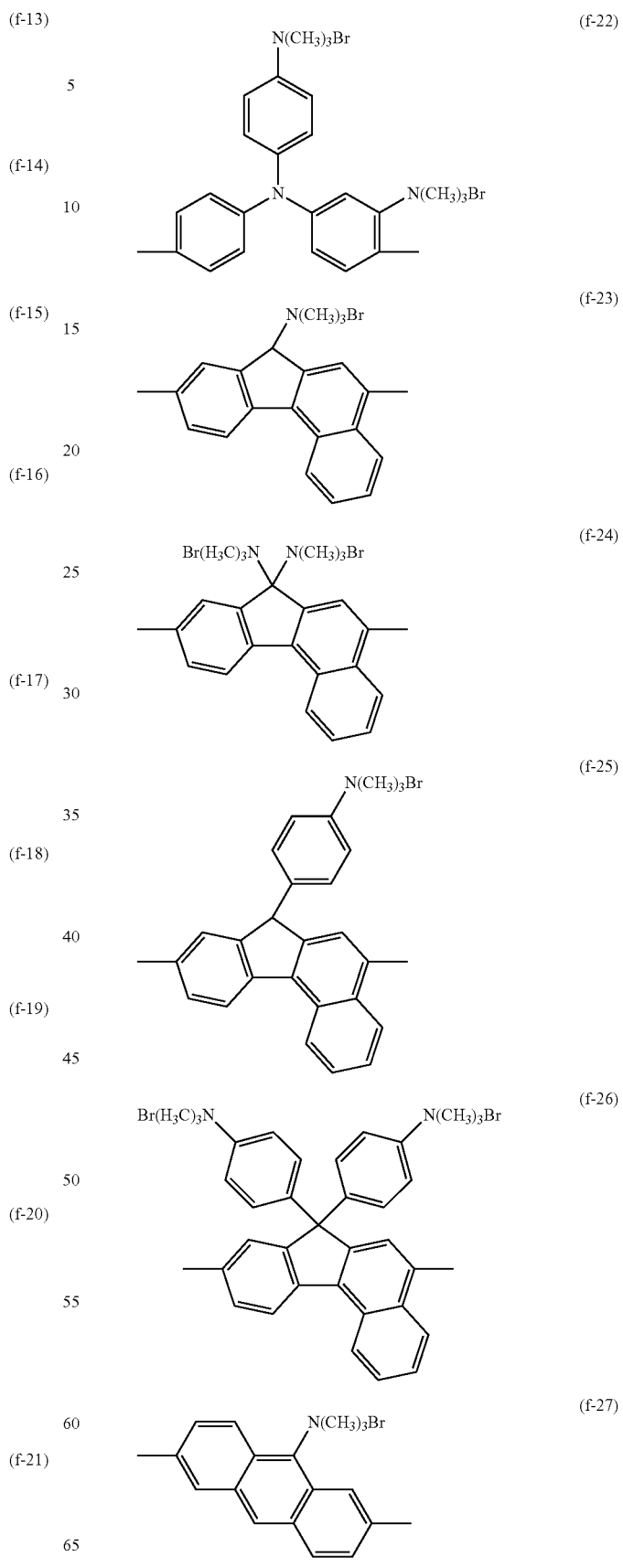

(f-28)
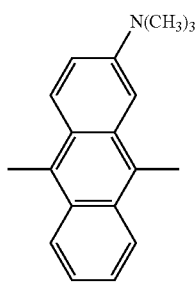
(f-29)
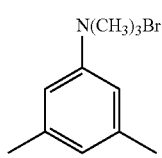
(f-30)
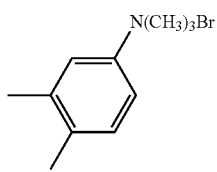
(f-31)
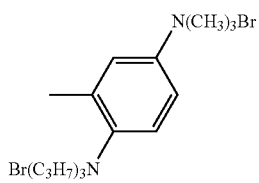
(f-32)
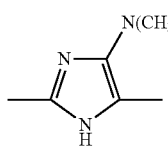
(f-33)
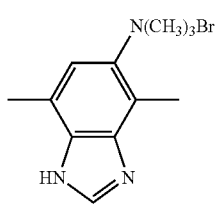
(f-34)
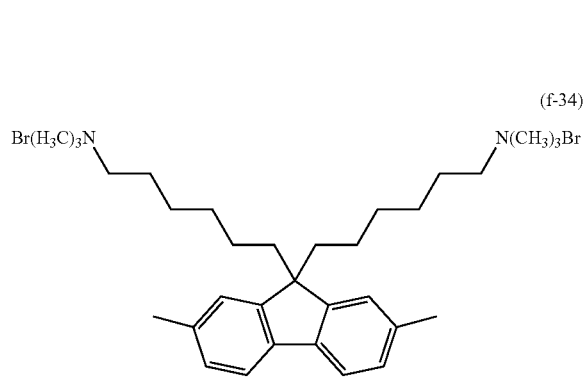
(f-35)
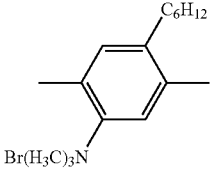
(g-1)
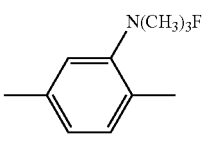
(g-2)
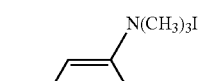
(g-3)
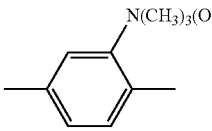
(g-4)
(g-5)
(g-6)
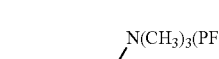
(g-7)
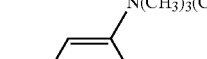
(g-8)
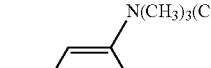
(g-9)
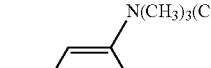

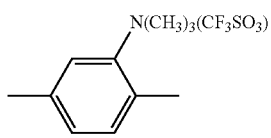 (g-10)

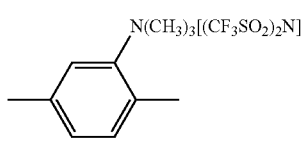 (g-11)

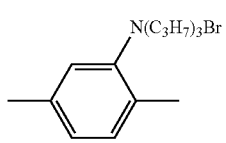 (g-12)

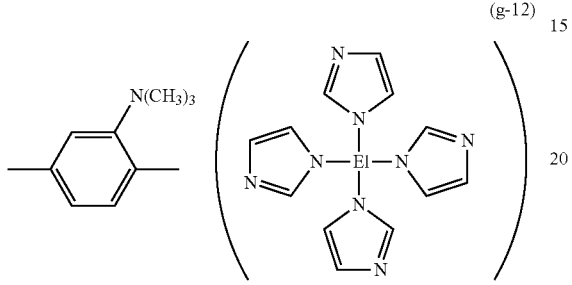 (g-13)

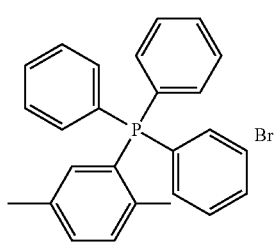 (g-14)

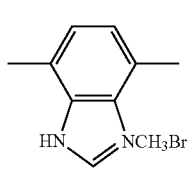 (g-15)

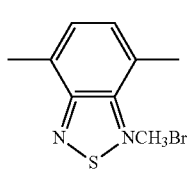 (g-16)

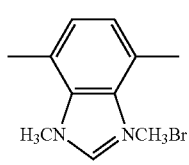 (g-17)

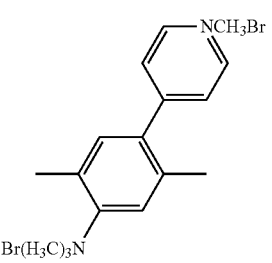 (g-18)

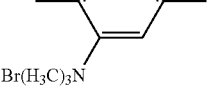 (g-19)

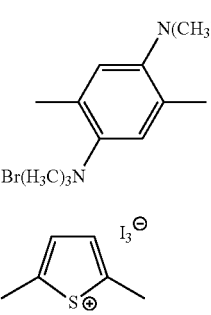 (g-20)

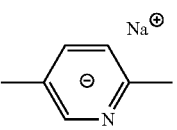 (g-21)

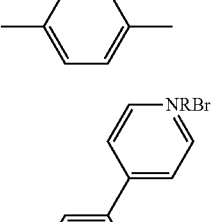 (g-22)

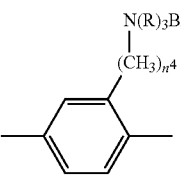 (g-23)

(g-24)

As the conjugated compound, conjugated compounds having constitutional units represented by the formula (c-1) to (c-15), (c-17), (c-20) to (c-22), (c-24) to (c-27), (c-29), (c-30) to (c-37), (d-1) to (d-6), (d-9), (d-11) to (d-16), (d-22), (d-31) to (d-39), (d-41) to (d-47), (e-1) to (e-3), (e-5) to (e-16), (f-1) to (f-6), (f-9), (f-11) to (f-16), (f-22), (f-31) to (f-35), (g-1) to (g-13) or (g-16) to (g-24) are preferable, conjugated compounds having constitutional units represented by the formula (c-1) to (c-15), (c-17), (c-20) to (c-22), (c-24) to (c-27), (c-29) to (c-32), (c-34) to (c-37), (d-1) to (d-6), (d-9), (d-11), (d-13), (d-15), (d-16), (d-22), (d-31) to (d-39), (d-41), (d-42), (d-47), (e-1), (e-5) to (e-8), (e-11), (e-12), (e-15), (e-16), (f-1) to (f-6), (f-9), (f-11), (f-13), (f-15), (f-16), (f-22), (f-31), (f-34), (f-35), (g-1) to (g-3), (g-6) to (g-13) or (g-16) to (g-24) are more preferable, conjugated compounds having constitutional units represented by the formula (c-1) to (c-4), (c-13) to (c-15), (c-20) to (c-22), (c-25) to (c-27), (c-30) to (c-32), (d-1), (d-2), (d-5), (d-6), (d-9), (d-11), (d-13), (d-22), (d-31) to (d-38), (d-41), (d-42), (d-47), (e-1), (e-5), (e-7), (e-8), (e-11), (e-12), (e-15), (e-16), (f-1), (f-2), (f-5), (f-6), (f-9), (f-11), (f-13), (f-22), (f-31), (f-34), (f-35), (g-1) to (g-3), (g-6), (g-7), (g-9) to (g-13) or (g-18) to (g-21) are further preferable, conjugated compounds having constitutional units represented by the formula (c-1) to (c-4), (c-15), (c-22), (c-27), (d-6), (d-22), (d-34) to (d-38), (d-41), (d-42), (e-1), (e-5), (e-8), (e-12), (e-15), (f-6), (f-34), (g-2), (g-6), (g-7), (g-10) to (g-12) or (g-18) to (g-21) are particularly preferable, conjugated compounds having constitutional units represented by the formula (c-1) to (c-4), (d-6), (d-34), (d-36) to (d-38), (d-41), (d-42), (f-6), (f-34), (g-2) or (g-10) to (g-12) are especially preferable, conjugated compounds having constitutional units represented by the formula (c-1) to (c-4), (d-38), (d-41) or (d-42) are extraordinarily preferable.

The conjugated compound may have a constitutional unit other than the constitutional unit represented by the formula (XI).

The constitutional unit other than the constitutional unit represented by the formula (XI), which the conjugated compound can have includes, for example, an atomic group remaining after removing, from an aromatic compound represented by the formulae (1) to (95), two hydrogen atoms bonded directly to carbon atoms constituting the ring, an atomic group remaining after removing one hydrogen atom from a hydrocarbyl group, and an atomic group remaining after removing, from an optionally substituted monovalent heterocyclic group, one hydrogen atom bonded directly to a carbon atom constituting the ring, preferably an atomic group remaining after removing, from an aromatic compound represented by the formulae (1) to (95), two hydrogen atoms bonded directly to carbon atoms constituting the ring or an atomic group remaining after removing one hydrogen atom from a hydrocarbyl group, more preferably an atomic group remaining after removing, from an aromatic compound represented by the formulae (1) to (95), two hydrogen atoms bonded directly to carbon atoms constituting the ring, further preferably an atomic group remaining after removing, from an aromatic compound represented by the formula (1) to (8), (17), (19), (59), (78) to (81) or (92) to (95), two hydrogen atoms bonded directly to carbon atoms constituting the ring, particularly preferably an atomic group remaining after removing, from an aromatic compound represented by the formula (1), (2), (8), (17) or (59), two hydrogen atoms bonded directly to carbon atoms constituting the ring, especially preferably an atomic group remaining after removing, from an aromatic compound represented by the formula (3) or (8), two hydrogen atoms bonded directly to carbon atoms constituting the ring.

The constitutional units of a conjugated compound containing constitutional units represented by the formula (XI) may be mutually linked via a group represented by the following formulae (h-1) to (h-19). The group represented by the following formulae (h-1) to (h-19) is preferably a group represented by the formula (h-1), (h-3) to (h-6), (h-9) or (h-13), more preferably a group represented by the formula (h-9) or (h-13). When the above-described conjugated compound has a constitutional unit other than the constitutional unit represented by the above-described formula (XI) (including groups represented by the above-described formulae (h-1) to (h-19)), it is preferable that the other constitutional unit is introduced in an amount not disturbing conjugation of the conjugated compound.

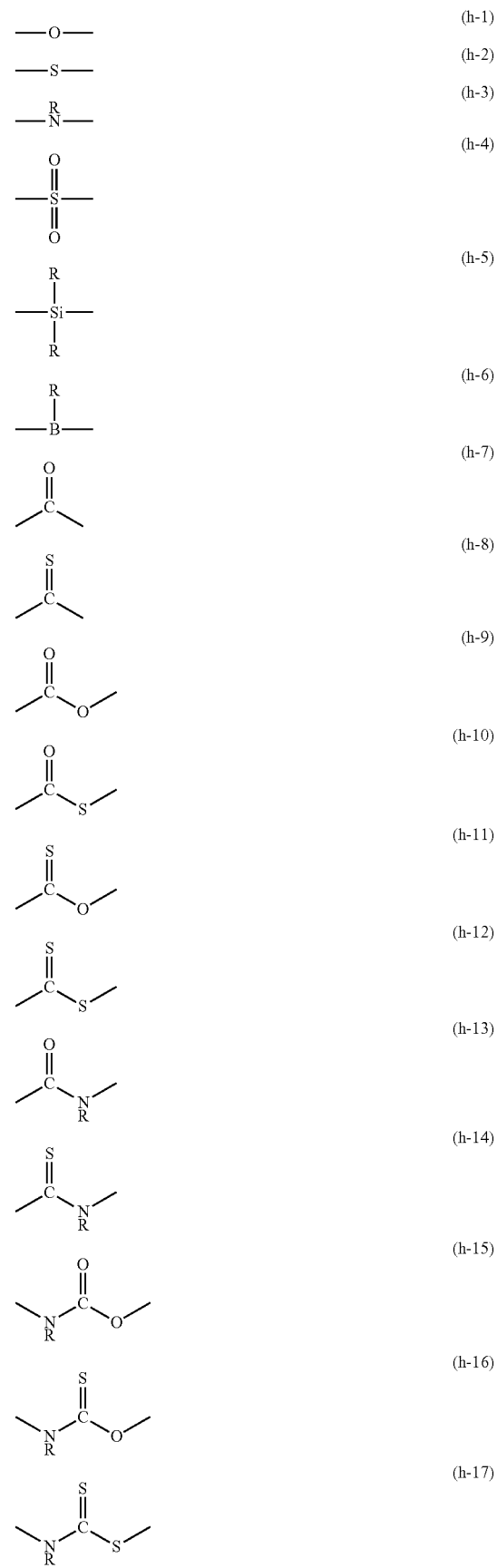

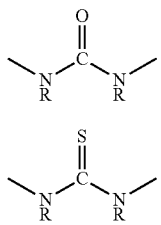

(wherein, R represents a hydrogen atom or an optionally substituted hydrocarbyl group.)

In the composition for forming a conductive film of the present invention, the ionic compound and/or the polar compound is contained in an amount of preferably 0.1 part by weight or more, more preferably 1 part by weight or more, further preferably 5 parts by weight or more with respect to 100 parts by weight of a metal compound. In the composition for forming a conductive film of the present invention, the ionic compound and/or the polar compound is preferably 100 parts by weight or less, more preferably 50 parts by weight or less, further preferably 30 parts by weight or less, with respect to 100 parts by weight of a metal compound.

It is preferable that the composition for forming a conductive film of the present invention contains a compound having at least one atom selected from the group consisting of a nitrogen atom, a sulfur atom and a phosphorus atom, and it is more preferable that the composition contains a compound having a nitrogen atom or a sulfur atom.

The reason for this is that by further inclusion of a compound having at least one atom selected from the group consisting of a nitrogen atom, a sulfur atom and a phosphorus atom, a tendency of easier reduction of a metal compound contained in the composition for forming a conductive film of the present invention is generated. The metal compound contained in the composition for forming a conductive film of the present invention and the compound having at least one atom selected from the group consisting of a nitrogen atom, a sulfur atom and a phosphorus atom interact with each other to improve solubility in a solvent in some cases.

The compound having a nitrogen atom includes, for example, amine compounds and nitrogen-containing heterocyclic compounds, preferably amine compounds. The amine compound has a number of carbon atoms of usually 1 to 50.

The amine compound includes, for example, monoamine compounds such as methylamine, dimethylamine, trimethylamine, ethylamine, diethylamine, triethylamine, propylamine, dipropylamine, isopropylamine, diisopropylamine, butylamine, isobutylamine, sec-butylamine, tert-butylamine, pentylamine, hexylamine, cyclohexylamine, heptylamine, octylamine, 2-ethylhexylamine, nonylamine, decylamine, 3,7-dimethyloctylamine, laurylamine, cyclopentylamine, dicyclopentylamine, cyclohexylamine, dicyclohexylamine, ditrifluoromethylamine, phenylamine, diphenylamine, $C_1$ to $C_{12}$ alkoxyphenylamine, di($C_1$ to $C_{12}$ (denoting a number of carbon atoms of 1 to 12, the same shall apply hereinafter) alkoxyphenyl)amine, di($C_1$ to $C_{12}$ alkylphenyl)amine, 1-naphthylamine, 2-naphthylamine, pentafluorophenylamine, pyridylamine, pyridazinylamine, pyrimidylamine, pyrazylamine, triazylamine, phenyl-$C_1$ to $C_{12}$ alkylamine, $C_1$ to $C_{12}$ alkoxyphenyl-$C_1$ to $C_{12}$ alkylamine, $C_1$ to $C_{12}$ alkylphenyl-$C_1$ to $C_{12}$ alkylamine, di($C_1$ to $C_{12}$ alkoxyphenyl-$C_1$ to $C_{12}$ alkyl)amine, di($C_1$ to $C_{12}$ alkylphenyl-$C_1$ to $C_{12}$ alkyl)amine, 1-naphthyl-$C_1$ to $C_{12}$ alkylamine and 2-naphthyl-$C_1$ to $C_{12}$ alkylamine, ethanolamine, propanolamine and the like, diamine compounds such as 1,2-ethylenediamine, tetraethylenediamine, phenylenediamine and the like, preferably triethylamine or 1,2-ethylenediamine.

The number of carbon atoms constituting the heterocyclic ring of the nitrogen-containing heterocyclic compound is usually 3 to 20. The nitrogen-containing heterocyclic compound includes, for example, pyridine, quinoline, 1,2-diazine, 1,3-diazine, 1,4-diazine, 1,3,5-triazine, pyrrole, pyrazole, imidazole, oxazole, thiazole, oxadiazole, thiadiazole, azadiazole and the like.

The compound having a sulfur atom includes sulfide compounds, thiol compounds, sulfur-containing heterocyclic compounds and sulfoxide compounds, preferably sulfide compounds.

The sulfide compound has a number of carbon atoms of usually 3 to 20.

The sulfide compound includes dimethyl sulfide, tetrahydrothiophene, diethyl sulfide, propylmethyl sulfide, propylethyl sulfide, butylmethyl sulfide, butylethyl sulfide, butylpropyl sulfide, dipropyl sulfide, dibutyl sulfide, phenylmethyl sulfide, phenylethyl sulfide, phenylpropyl sulfide, phenylbutyl sulfide, benzyl methyl sulfide, benzyl ethyl sulfide, benzyl propyl sulfide, benzyl butyl sulfide, benzyl phenyl sulfide, dibenzyl sulfide, methionine, methionine methyl ester, methionine propyl ester, methionine butyl ester, methylthioacetic acid, methyl methylthioacetate, ethyl methylthioacetate, propyl methylthioacetate, butyl methylthioacetate, phenyl methylthioacetate, benzyl methylthioacetate, 1,3-dithiane, 2-methyl-1,3-dithiane, 2-phenyl-1,3-dithiane, 2-ethyl-1,3-dithiane, 2-propyl-1,3-dithiane, 2-butyl-1,3-dithiane, 1,3-dithiane-2-carboxylic acid, methyl 1,3-dithiane-2-carboxylate, ethyl 1,3-dithiane-2-carboxylate, propyl 1,3-dithiane-2-carboxylate, butyl 1,3-dithiane-2-carboxylate, phenyl 1,3-dithiane-2-carboxylate, benzyl 1,3-dithiane-2-carboxylate, thietane, thiirane, thiirene, thiane, thiepane and the like.

The thiol compound has a number of carbon atoms of usually 1 to 20.

The thiol compound includes methanethiol, ethanethiol, propanethiol, butanethiol, thiophenol, 1,2-ethanedithiol, 1,3-ethanedithiol, 1,4-ethanedithiol, 1,8-octanedithiol, mercaptoacetic acid, methyl mercaptoacetate, ethyl mercaptoacetate, propyl mercaptoacetate, butyl mercaptoacetate, phenyl mercaptoacetate, benzyl mercaptoacetate, cysteine, cysteine methyl ester, cysteine ethyl ester, cysteine propyl ester, cysteine butyl ester, cysteine phenyl ester, cysteine benzyl ester, dodecanethiol, decanethiol, p-hexylphenylmethanethiol, p-octylbenzenethiol and the like.

The number of carbon atoms constituting the heterocyclic ring of the sulfur-containing heterocyclic compound is usually 3 to 20. The sulfur-containing heterocyclic compound includes thiophene, benzothiophene, dibenzothiophene, thiazole, benzothiazole, benzothiadiazole, thiazine, benzothiazine and the like.

The sulfoxide compound has a number of carbon atoms of usually 2 to 20.

The sulfoxide compound includes dimethyl sulfoxide, methylethyl sulfoxide, methylpropyl sulfoxide, methylbutyl sulfoxide, methylphenyl sulfoxide, methylbenzyl sulfoxide, ethylphenyl sulfoxide, ethylbenzyl sulfoxide, propylphenyl sulfoxide, propylbenzyl sulfoxide, butylphenyl sulfoxide, butylbenzyl sulfoxide and the like.

The compound having a phosphorus atom includes phosphine compounds. The phosphine compound has a number of carbon atoms of usually 1 to 20.

The phosphine compound includes trimethylphosphine, triphenylphosphine, diphenylphosphinoethane, diphenylphosphinopropane and the like. The composition for forming a conductive film of the present invention may contain two or more compounds having at least one atom selected from the group consisting of a nitrogen atom, a sulfur atom and a phosphorus atom.

The composition for forming a conductive film of the present invention may be an ink (ink composition) containing a solvent or a dispersing medium, and a conductive film can be formed using the ink (ink composition).

The ink (ink composition) of the present invention usually contains a solvent, in addition to a metal compound, a reducing agent, and an ionic compound and/or a polar compound.

When the reducing agent is an alcohol type reducing solvent or the like, a solvent other than the alcohol type reducing solvent may not be contained.

It is preferable that the ink (ink composition) of the present invention is dissolved in a solvent.

The solvent which can be used in the ink (ink composition) of the present invention is not particularly restricted providing a metal compound and an ionic compound and/or a polar compound can be dissolved or dispersed therein, and examples thereof include alcohol type reducing solvents described above, water, acetone, hexane, xylene, toluene, chlorobenzene, nitrobenzene, α-pinene, ethylene glycol diacetate, dibutyl phthalate, butyl carbitol acetate, N-methyl-2-pyrrolidone, N,N-dimethylformamide, N,N-dimethylacetamide and the like.

The conductive film of the present invention is a conductive film formed from the composition for forming a conductive film of the present invention, and it is preferable that the conductive film of the present invention is a conductive film formed from the ink (ink composition) of the present invention.

The conductive film can be suitably used in electronic devices, and can be suitably used particularly as an electrode (namely, cathode and/or anode). This electrode can be used in electronic devices such as, for example, light emitting devices (for example, organic EL device), transistors (for example, organic transistors), photoelectric conversion devices (for example, organic solar batteries) and the like.

The conductive film formed from the composition for forming a conductive film of the present invention is preferably formed by a production method comprising a step of coating the ink (ink composition) of the present invention and a step of reducing a metal compound contained in the composition by heating the resultant coated film.

In the step of coating the ink (ink composition) of the present invention, for example, coating methods such as a spin coat method, a casting method, a bar coat method, a roll coat method, a wire bar coat method, a dip coat method, a slit coat method, a capillary coat method, a spray coat method, a nozzle coat method and the like; printing methods such as a microgravure printing method, a gravure printing method, a screen printing method, a flexo printing method, an offset printing method, a reversal printing method, an ink jet printing method and the like; etc. can be used.

In the step of reducing a metal compound contained in the composition by heating the resultant coated film, it is preferable that the coated film is heated at 400° C. or lower, and from the standpoint of stability of the ionic compound and the conjugated compound contained in the composition for forming a conductive film of the present invention, heating is performed more preferably at 300° C. or lower, further preferably at 200° C. or lower, particularly preferably at 150° C. or lower.

It is preferable that the conductive film formed by the method of producing a conductive film of the present invention contains an ionic compound and/or a polar compound, and it is more preferable that the film contains an ionic compound.

When the conductive film of the present invention contains an ionic compound and/or a polar compound, the residual amount of the ionic compound and/or the polar compound contained in the conductive film is preferably 50% or more, more preferably 80% or more, particularly preferably 90% or more based on the ionic compound and/or the polar compound contained in the composition for forming a conductive film.

The conductive film formed by the method of producing a conductive film of the present invention may be subjected to surface flattening depending on its use.

As the flattening method, any known methods may be used, and examples thereof include a method of applying pressure on the surface of the conductive film, a method of mechanically scraping a protruding portion, a method of scraping a protruding portion by plasma and the like, a method of scraping the outermost surface with an etching solution, a method of forming a conductive film on a peelable transfer membrane and transferring the conductive film to another substrate to expose the flattened face to the surface, and the like.

The center line average roughness (Ra) of the surface of the conductive film is preferably Ra<50 nm, more preferably 30 nm or less, further preferably 10 nm or less, since defects of electrical connection such as short circuit and the like can be prevented efficiently when the conductive film is used in a lower electrode of an electronic device. Ra can be measured based on JIS-B0601-2001 of Japanese Industrial Standards JIS referring to JIS-B0651 to JIS-B0656 and JIS-B0671-1 and the like.

EXAMPLES

The present invention will be illustrated specifically by examples and comparative examples below, but the present invention is not limited to them.

The surface resistance (Ω/□) of the conductive film was measured using a resistivity meter (manufactured by Mitsubishi Chemical Corporation, Loresta GP MCP-T610 type).

Synthesis Example 1

Synthesis of Ionic Compound P-1

2,7-dibromo-9-fluorenone (52.5 g), ethyl salicylate (154.8 g) and mercaptoacetic acid (1.4 g) were added into a 300 mL flask, the gas in the flask was purged with a nitrogen gas. To this was added methanesulfonic acid (630 mL), and the mixture was stirred at 75° C. overnight. The resultant mixture was left to cool, and added into ice water and stirred for 1 hour. The resultant solid was separated by filtration, and washed with heated acetonitrile. The washed solid was dissolved in acetone, a solid was re-crystallized from the resultant acetone solution, and separated by filtration.

The solid obtained above (62.7 g), 2-[2-(2-methoxyethoxy)ethoxy]-p-toluenesulfonate (86.3 g), potassium carbonate (62.6 g) and 1,4,7,10,13,16-hexaoxacyclooctadecane (referred to also as "18-crown-6" in some cases) (7.2 g) were dissolved in N, N-dimethylformamide (referred to as "DMF" in some cases) (670 mL), the resultant solution was transferred into a flask and stirred at 105° C. overnight. The resultant mixture was left to cool to room temperature, and added into ice water and stirred for 1 hour.

To the resultant reaction solution was added chloroform (300 mL) and liquid separation and extraction were performed, and the resultant organic phase was concentrated, to obtain 2,7-dibromo-9,9-bis[3-ethoxycarbonyl-4-[2-[2-(2-methoxyethoxyl)ethoxy]ethoxy]phenyl]-fluorene (compound D) (51.2 g).

Compound D

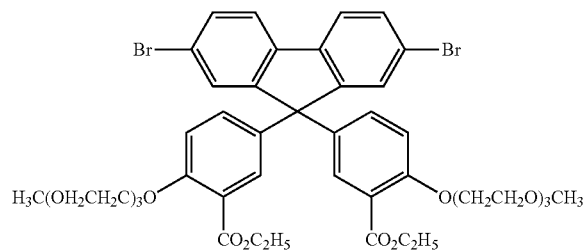

A nitrogen gas atmosphere was prepared in a flask, then, the compound D (15 g), bis(pinacolato)diboron (8.9 g), [1,1'-bis(diphenylphosphino)ferrocene]dichloropalladium (II) dichloromethane complex (0.8 g), 1,1'-bis(diphenylphosphino)ferrocene (0.5 g), potassium acetate (9.4 g) and dioxane (400 mL) were added, heated at 110° C., and refluxed with heating for 10 hours. After left to cool, the resultant reaction solution was filtrated, and the resultant filtrate was concentrated under reduced pressure. The resultant residue was washed with methanol three times, dissolved in toluene, to the resultant solution was added activated carbon and the mixture was stirred. Thereafter, filtration was performed, and the resultant filtrate was concentrated under reduced pressure, to obtain 2,7-bis(4,4,5,5-tetramethyl-1,3,2-dioxaborolan-2-yl)-9,9-bis[3-ethoxycarbonyl-4-[2-[2-(2-methoxyethoxyl)ethoxy]ethoxy]phenyl]-fluorene (compound E) (11.7 g).

Compound E

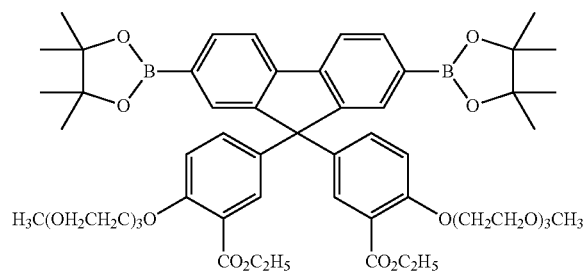

An inert gas atmosphere was prepared in a flask, then, the compound D (0.55 g), the compound E (0.61 g), triphenylphosphinepalladium (0.01 g), methyl trioctyl ammonium chloride (manufactured by Sigma Aldrich, trade name Aliquat336 (registered trademark)) (0.20 g) and toluene (10 mL) were added, and heated at 105° C. Into the resultant reaction solution, a 2M sodium carbonate aqueous solution (6 mL) was dropped, and the mixture was refluxed for 8 hours. To the resultant reaction solution was added 4-tert-butylphenylboronic acid (0.01 g) and the mixture was refluxed for 6 hours. Thereafter, to this was added a sodium diethyldithiacarbamate aqueous solution (10 mL, concentration: 0.05 g/mL) and the mixture was stirred for 2 hours. The resultant mixed solution was dropped into methanol (300 mL) and the mixture was stirred for 1 hour, then, the deposited precipitate was filtrated, dried under reduced pressure for 2 hours, and dissolved in tetrahydrofuran (20 mL). The resultant solution was dropped into a mixed solvent of methanol (120 mL) and a 3 wt % acetic acid aqueous solution (50 mL) and the mixture was stirred for 1 hour, then, the deposited precipitate was filtrated, and dissolved in tetrahydrofuran (20 mL). The resultant solution was dropped into methanol (200 mL) and the mixture was stirred for 30 minutes, then, the deposited precipitate was filtrated, to obtain a solid.

The resultant solid was dissolved in tetrahydrofuran, and purified by passing through an alumina column and a silica gel column. The tetrahydrofuran solution recovered from the column was concentrated, then, dropped into methanol (200 mL), and the deposited solid was filtrated, and dried. The yield of the resultant poly[9,9-bis[3-ethoxycarbonyl-4-bis[2-[2-(2-methoxyethoxyl)ethoxy]ethoxy]phenyl]-fluorene] (compound F) was 520 mg.

The compound F had a polystyrene-equivalent number-average molecular weight of $5.2 \times 10^4$. The compound F is composed of a constitutional unit represented by the following formula, according to the result of NMR.

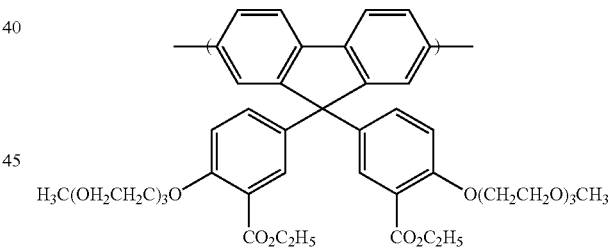

The compound F (200 mg) was placed in a 100 mL flask, and the gas in the flask was purged with a nitrogen gas. Thereafter, to this were added tetrahydrofuran (20 mL) and ethanol (20 mL), and the resultant mixture was heated up to 55° C. Thereafter, an aqueous solution prepared by dissolving cesium hydroxide (200 mg) in water (2 mL) was added to this, and the mixture was stirred at 55° C. for 6 hours. The resultant mixture was cooled down to room temperature, then, the reaction solvent was distilled off under reduced pressure. The resultant solid was washed with water, and dried under reduced pressure, to obtain a pale yellow solid (150 mg, cesium salt of compound F, hereinafter, referred to as "ionic compound P-1"). It was confirmed according to the NMR spectrum that a signal derived from an ethyl group at an ethyl ester portion in the compound F disappeared completely. The ionic compound P-1 is composed of a constitutional unit represented by the following formula.

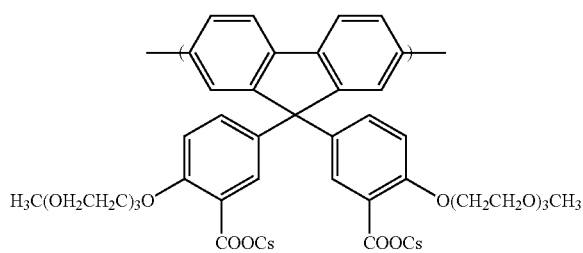

The polystyrene-equivalent number-average molecular weight of the ionic compound P-1 was identical to that of the compound F.

Example 1

Fabrication of Conductive Film F-1

With respect to 1.0 part by weight of silver acetate, 0.1 part by weight of the ionic compound P-1 (namely, 10 parts by weight with respect to 100 parts by weight of silver compound), 0.5 parts by weight of ethylene glycol (corresponding to reducing agent), 1.0 part by weight of 1,2-ethylenediamine (EDA) and 10.0 parts by weight of 1-butanol were mixed, to prepare an ink composition for forming a conductive film.

The resultant ink composition was spin-coated on a glass substrate. The resultant glass substrate was heated at 200° C. in air for 10 minutes to evaporate the solvent, then, cooled down to room temperature, to obtain a conductive film F-1 having a thickness of about 200 nm.

Comparative Example 1

Fabrication of Conductive Film FS-1

A conductive film FS-1 was obtained in the same manner as in Example 1 excepting that the ionic compound P-1 was not used in Example 1.

Example 2

Fabrication of Conductive Film F-2

A conductive film F-2 was obtained in the same manner as in Example 1 excepting that methanol was used instead of 1-butanol in Example 1.

Example 3

Fabrication of Conductive Film F-3

A conductive film F-3 was obtained in the same manner as in Example 2 excepting that tetrahydrothiophene (THT) was used instead of 1,2-ethylenediamine in Example 2.

Comparative Example 2

Fabrication of Conductive Film FS-2

The same operation as in Example 3 was conducted excepting that the ionic compound P-1 was not used in Example 3, to obtain no conductive film FS-2.

Example 4

Fabrication of Conductive Film F-4

A conductive film F-4 was obtained in the same manner as in Example 2 excepting that 1.0 part by weight of 1,2-ethylenediamine and 1.0 part by weight of tetrahydrothiophene were used instead of 1.0 part by weight of 1,2-ethylenediamine in Example 2.

[Evaluation of Conductive Film]

The surface resistances of the conductive films F1 to 4 and the conductive films FS 1 to 2 obtained above were measured. The results are shown in Table 1.

TABLE 1

| | Conductive film | Ionic compound P-1 | Other components | Surface resistance ($\Omega/\square$) |
|---|---|---|---|---|
| Example 1 | F-1 | use | EDA | 14 |
| Comparative Example 1 | FS-1 | nonuse | EDA | 122 |
| Example 2 | F-2 | use | EDA | 15 |
| Example 3 | F-3 | use | THT | 2.5 |
| Comparative Example 2 | FS-2 | nonuse | THT | Film formation is impossible |
| Example 4 | F-4 | use | EDA and THT | 27 |

As apparent from Table 1, the conductive films formed from the compositions for forming a conductive film of the present invention are excellent in electric conductivity because of small surface resistance. The composition for forming a conductive film containing the ionic compound P-1 is excellent also in film-formability. From these results, the conductive films formed from the compositions for forming a conductive film of the present invention are useful for formation of a conductive film such as an electrode and the like in an electronic device.

INDUSTRIAL APPLICABILITY

According to the present invention, a composition for forming a conductive film, which is useful for formation of a conductive film excellent in electric conductivity can be provided. According to a preferable embodiment of the present invention, a composition for forming a conductive film excellent in film-formability can be provided. Further, according to the present invention, a method of producing a conductive film using the composition and a conductive film produced by this production method can be provided. The conductive film formed from the composition for forming a conductive film of the present invention can be used particularly suitably as a conductive film in an electronic device because of inclusion of an ionic compound and/or a polar compound.

The invention claimed is:
1. A composition for forming a conductive film, comprising a metal compound, a reducing agent, an ionic compound and/or a polar compound, and a compound having at least one atom selected from the group consisting of a nitrogen atom, a sulfur atom and a phosphorus atom,
wherein a molecular weight of the ionic compound and/or polar compound is 1000 or more, and the ionic compound and/or polar compound comprises a constitutional unit represented by the following formula (XI):

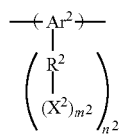 (XI)

wherein $Ar^2$ represents a $(n^2+2)$-valent aromatic group and the $(n^2+2)$-valent aromatic group may have a substituent, $R^2$ represents a direct bond or a $(m^2+1)$-valent group, $X^2$ represents a group comprising an ionic group or a polar group, and $m^2$ and $n^2$ represent each independently an integer of 1 or more, and when $R^2$ is a direct bond, $m^2$ is 1, and when there are a plurality of $R^2$, they may be the same or different, and when there are a plurality of $X^2$, they may be the same or different, and when there are a plurality of $m^2$, they may be the same or different, wherein the compound having at least one atom selected from the group consisting of a nitrogen atom, a sulfur atom and a phosphorus atom is selected from the group consisting of an amine compound, a nitrogen-containing heterocyclic compound, a sulfide compound, a thiol compound, a sulfur-containing heterocyclic compound, a sulfoxide compound and a phosphine compound, wherein the amine compound is methylamine, dimethylamine, trimethylamine, ethylamine, diethylamine, triethylamine, propylamine, dipropylamine, isopropylamine, diisopropylamine, butylamine, isobutylamine, sec-butylamine, tert-butylamine, pentylamine, hexylamine, cyclohexylamine, heptylamine, octylamine, 2-ethylhexylamine, nonylamine, decylamine, 3,7-dimethyloctylamine, laurylamine, cyclopentylamine, dicyclopentylamine, cyclohexylamine, dicyclohexylamine, ditrifluoromethylamine, phenylamine, diphenylamine, alkoxyphenylamine in which the alkoxy group has 1 to 12 carbon atoms, di(alkoxyphenyl)amine in which the alkoxy groups have 1 to 12 carbon atoms, di(alkylphenyl)amine in which the alkyl groups have 1 to 12 carbon atoms, 1-naphthylamine, 2-naphthylamine, pentafluorophenylamine, pyridylamine, pyridazinylamine, pyrimidylamine, pyrazylamine, triazylamine, phenyl-alkylamine in which the alkyl group has 1 to 12 carbon atoms, alkoxyphenyl-alkylamine in which the alkoxy group and the alkyl group have 1 to 12 carbon atoms, alkylphenyl-alkylamine in which the alkyl groups have 1 to 12 carbon atoms, di(alkoxyphenyl-alkyl)amine in which the alkoxy groups and the alkyl groups have 1 to 12 carbon atoms, di(alkylphenyl-alkyl)amine in which the alkyl groups have 1 to 12 carbon atoms, 1-naphthyl-alkylamine in which the alkyl group has 1 to 12 carbon atoms, 2-naphthyl-alkylamine in which the alkyl group has 1 to 12 carbon atoms, ethanolamine, propanolamine, 1,2-ethylenediamine, tetraethylenediamine or phenylenediamine, and wherein the nitrogen-containing heterocyclic compound is pyridine, quinoline, 1,2-diazine, 1,3-diazine, 1,4-diazine, 1,3,5-triazine, pyrrole, pyrazole, imidazole, oxazole, thiazole, oxadiazole, thiadiazole or azadiazole.

2. The composition for forming a conductive film according to claim 1, wherein the metal constituting said metal compound is gold, silver or copper.

3. The composition for forming a conductive film according to claim 1, wherein said metal compound is a metal carboxylate.

4. The composition for forming a conductive film according to claim 1, wherein said reducing agent is an alcohol.

5. The composition for forming a conductive film according to claim 1, wherein an amount of said ionic compound and/or polar compound is 0.1 to 30 parts by weight with respect to 100 parts by weight of said metal compound.

6. The composition for forming a conductive film according to claim 1, wherein said ionic compound and/or polar compound is an ionic compound.

7. The composition for forming a conductive film according to claim 1, wherein said compound having a nitrogen atom is an amine compound.

8. The composition for forming a conductive film according to claim 1, wherein said compound having a sulfur atom is a sulfide compound.

9. The composition for forming a conductive film according to claim 1, wherein the composition is an ink composition.

10. The composition for forming a conductive film according to claim 6, wherein said compound having a nitrogen atom is an amine compound.

11. The composition for forming a conductive film according to claim 6, wherein said compound having a sulfur atom is a sulfide compound.

12. A method of producing a conductive film, comprising a step of coating the ink composition according to claim 9 on a substrate and a step of reducing said metal compound by heating the resultant coated film.

13. The method of producing a conductive film according to claim 12, wherein the temperature of heating said coated film is 200° C. or lower.

14. A conductive film formed by the method of producing a conductive film according to claim 12, and comprising an ionic compound and/or a polar compound.

15. An electronic device, equipped with the conductive film according to claim 14.

16. The electronic device according to claim 15, wherein said conductive film is a cathode and/or an anode.

* * * * *